(12) United States Patent
Chidlovskii et al.

(10) Patent No.: US 8,386,574 B2
(45) Date of Patent: Feb. 26, 2013

(54) MULTI-MODALITY CLASSIFICATION FOR ONE-CLASS CLASSIFICATION IN SOCIAL NETWORKS

(75) Inventors: Boris Chidlovskii, Meylan (FR); Matthijs Hovelynck, RV Utrecht (NL)

(73) Assignee: Xerox Corporation, Norwalk, CT (US)

( * ) Notice: Subject to any disclaimer, the term of this patent is extended or adjusted under 35 U.S.C. 154(b) by 671 days.

(21) Appl. No.: 12/608,143

(22) Filed: Oct. 29, 2009

(65) Prior Publication Data
US 2011/0103682 A1 May 5, 2011

(51) Int. Cl.
G06F 15/16 (2006.01)
(52) U.S. Cl. ...................................................... 709/206
(58) Field of Classification Search ................... 709/206
See application file for complete search history.

(56) References Cited

U.S. PATENT DOCUMENTS

| | | | |
|---|---|---|---|
| 6,938,024 B1 * | 8/2005 | Horvitz | 706/45 |
| 7,167,866 B2 * | 1/2007 | Farnham et al. | 1/1 |
| 7,386,527 B2 | 6/2008 | Harris | |
| 7,725,475 B1 * | 5/2010 | Alspector et al. | 707/758 |
| 7,945,674 B2 * | 5/2011 | Appelman | 709/227 |
| 7,949,759 B2 * | 5/2011 | Appelman | 709/227 |
| 8,185,638 B2 * | 5/2012 | Appelman | 709/227 |
| 8,195,754 B2 * | 6/2012 | Beverly, IV | 709/206 |
| 2005/0076240 A1 * | 4/2005 | Appelman | 713/201 |
| 2005/0076241 A1 * | 4/2005 | Appelman | 713/201 |
| 2006/0190481 A1 * | 8/2006 | Alspector et al. | 707/103 R |
| 2008/0052398 A1 * | 2/2008 | Elshishiny | 709/226 |
| 2008/0069456 A1 | 3/2008 | Perronnin | |
| 2008/0086431 A1 * | 4/2008 | Robinson et al. | 706/11 |
| 2009/0086720 A1 * | 4/2009 | Westlake | 370/352 |
| 2009/0144033 A1 | 6/2009 | Liu et al. | |
| 2009/0319518 A1 * | 12/2009 | Koudas et al. | 707/5 |
| 2010/0082751 A1 * | 4/2010 | Meijer et al. | 709/206 |
| 2011/0196939 A1 * | 8/2011 | Appelman | 709/206 |

OTHER PUBLICATIONS

U.S. Appl. No. 12/252,531, filed Oct. 16, 2008, Perronnin et al.
Ah-Pine, et al., Clique-Based Clustering for Improving Named Entity Recognition systems, In *EACL*, pp. 51-59, 2009.
Bekkerman, et al., Automatic Categorization of Email into Folders: Benchmark Experiments on Enron and SRI Corpora, CIIR, Technical Report IR-418, 2004.
Blum, et al., Combining Labeled and Unlabeled Data with Co-Training, In *Proc. of the Workshop on Computational Learning Theory*, Morgan Kaufmann Publishers, 1998.
Bron, et al., Algorithm 457: Finding all Cliques of an Undirected Graph, *Communications of the ACM*, 16(9):575-577, 1973.
Chang, et al., *LIBSVM: a library for Support Vector Machines*, 2001. Software available at http://www.csie.ntu.edu.tw/~cjlin/libsvm.

(Continued)

*Primary Examiner* — Douglas Blair
(74) *Attorney, Agent, or Firm* — Fay Sharpe LLP

(57) ABSTRACT

A classification apparatus, method, and computer program product for multi-modality classification are disclosed. For each of a plurality of modalities, the method includes extracting features from objects in a set of objects. The objects include electronic mail messages. A representation of each object for that modality is generated, based on its extracted features. At least one of the plurality of modalities is a social network modality in which social network features are extracted from a social network implicit in the set of electronic mail messages. A classifier system is trained based on class labels of a subset of the set of objects and on the representations generated for each of the modalities. With the trained classifier system, labels are predicted for unlabeled objects in the set of objects.

22 Claims, 15 Drawing Sheets

OTHER PUBLICATIONS

Dietterich, Ensemble Methods in Machine Learning, In J. Kittler and F. Roli, editors, *Proceedings Multiple Classifier Systems*, 2000. vol. 1857, pp. 1-15. Springer Verlag, 2000.

Elsayed, et al., Modeling Identity in Archival Collections of Email: A Preliminary Study, In *Conference on Email and Anti-Spam*, 2006.

Evangelista, et al., Taming the Curse of Dimensionality in Kernels and Novelty Detection, In A. Abraham, B. Baets, M. Koppen, and B. Nickolay, editors, *Advances in Soft Computing: Applied Soft Computing Technologies: The Challenge of Complexity*, pp. 425-438. Springer Verlag, 2006.

F.E.R.C., *The Western Energy Crisis, The Enron Bankruptcy, and FERC's Response*, FERC Govt., http://www.ferc.gov/industries/electric/indus-act/wec/chron/chronology.%pdf. accessed Nov. 10, 2008.

Gleich, *MatlabBGL: A Matlab Graph Library*, http://www.stanford.edu/dgleich/programs/matlab\bgl/, 2008.

Heer, *Exploring Enron: Visual Data Mining of Email*, http://www.jheer.org/enron/, Sep. 25, 2009.

Joachims, A Statistical Learning Model of Text Classification for Support Vector Machines. In *Proc. of the 24th Annual Intl. ACM SIGIR Conf. on Research and Development in Information Retrieval*, pp. 128-136. ACM Press, 2001.

Kleinberg, Authoritative Sources in a Hyperlinked Environment. *Journal of the ACM*, 46(5):604-632, 1999.

Manevitz, et al., One-Class SVMs for Document Classification. *Journal of Machine Learning Research*, 2:139-154, 2001.

McCallum, et al., Topic and Role Discovery in Social Networks with Experiments on Enron and Academic Email. *Journal of Artificial Intelligence Research*, 30:249-272, 2007.

Newman, The Structure and Function of Complex Networks. *SIAM Review*, 45:167-256, 2003.

Platt, Probabilistic Outputs for Support Vector Machines and Comparisons to Regularized Likelihood Methods. In *Advances in Large Margin Classifiers*, pp. 61-74. MIT Press, 1999.

Regineri, M. Finding All Cliques of an Undirected Graph, Seminar—"Current Trends in IE" WS Jun. 7-Nov. 1, 2007.

Rowe, et al., Automated Social Hierarchy Detection Through Email Network Analysis. In *WebKDD/SNA-KDD '07: Proc. of the 9th WebKDD and 1st SNA-KDD 2007 workshop on Web mining and social network analysis*, pp. 109-117, New York, NY, USA, 2007. ACM.

Shetty, et al., Discovering Important Nodes Through Graph Entropy the Case of Enron Email Database, In *LinkKDD '05: Proc. of the 3rd Intl. Workshop on Link discovery*, pp. 74-81, New York, NY, USA, 2005. ACM Press.

Yeh, et al., Email Thread Reassembly Using Similarity Matching. In *Conf on Email and Anti-Spam*, 2006.

Yu, Single-Class Classification with Mapping Convergence, *Machine Learning*, 61(1-3)49-69, 2005.

* cited by examiner

US 8,386,574 B2

MULTI-MODALITY CLASSIFICATION FOR ONE-CLASS CLASSIFICATION IN SOCIAL NETWORKS

BACKGROUND

The exemplary embodiment relates to object classification. It finds particular application in connection with multi-modality one-class classification of a large corpus of documents, based on extracted features, and in one particular case, where only a small corpus of labeled documents may be available.

In a world where information becomes available in ever increasing quantities, document classification plays an important role by preselecting what documents are to be reviewed by a person and in what order. Applications of document selection range from search engines to spam filtering. However, more specialized tasks can be approached with the same techniques, such as document review in large corporate litigation cases.

During the pre-trial discovery process, the parties are requested to produce relevant documents. In cases involving large corporations, document production involves reviewing and producing documents which are responsive to the discovery requests to the case. The number of documents under review may easily run in the millions.

The review of documents by trained personnel is both time-consuming and costly. Additionally, human annotators are prone to errors. Accuracy and lack of consistency between annotators can be a problem. It has been found that both speed and accuracy of reviewers can be improved dramatically by grouping and ordering documents.

Systems have been developed to support human annotators by discovering structure in the corpus and presenting documents in a natural order. Usually the software that organizes the documents takes into account only the textual content of the documents.

INCORPORATION BY REFERENCE

The following references, the disclosures of which are incorporated herein by reference in their entireties, are mentioned:

U.S. Pub. No. 2008/0069456, published Jun. 4, 2009, entitled BAGS OF VISUAL CONTEXT-DEPENDENT WORDS FOR GENERIC VISUAL CATEGORIZATION, by Florent Perronnin, U.S. Pub. No. 2009/0144033, entitled OBJECT COMPARISON, RETRIEVAL, AND CATEGORIZATION METHODS AND APPARATUSES, by Yan Liu, et al., and U.S. Ser. No. 12/252,531, filed Oct. 16, 2008, entitled MODELING IMAGES AS MIXTURES OF IMAGE MODELS, by Florent Perronnin, et al. disclose systems and methods for categorizing images based on content.

Support Vector Machines as text classifiers are described, for example, in U.S. Pat. No. 7,386,527, entitled EFFECTIVE MULTI-CLASS SUPPORT VECTOR MACHINE CLASSIFICATION.

BRIEF DESCRIPTION

In accordance with one aspect of the exemplary embodiment, a method of classification includes, for each of a plurality of modalities, extracting features from objects in a set of objects, the objects comprising electronic mail messages, and generating a representation of each object based on its extracted features, at least one of the plurality of modalities being a social-network modality in which social network features are extracted from a social network implicit in the electronic mail messages. The method further includes training a classifier system based on class labels of a subset of the set of objects and on the representations generated for each of the modalities. With the trained classifier system, labels are predicted for unlabeled objects in the set of objects. Any one or more of these steps may be implemented by a computer processor.

In accordance with another aspect of the exemplary embodiment, a classification apparatus includes an input for receiving a set of objects, the objects comprising electronic mail messages, a subset of the objects having class labels. A first feature extractor extracts text-based features from objects in a set of objects. A second feature extractor extracts social network-based features from the objects in the set of objects. A classifier system, executed by a computer processor, which predicts labels for unlabeled objects in the set of objects based on the extracted text-based and social network-based features.

In another aspect, a classification method includes, for each of a plurality of modalities, extracting features from objects in a set of objects comprising electronic mail messages and generating a representation of each object based on its extracted features. A one-class classifier system is trained, based on class labels of a subset of the set of objects and on the representations generated for each of the modalities. The training includes, for each of the modalities and based on an initial set of objects positively labeled with respect to the class, generating an initial hypothesis which predicts negative labels for a subset of the unlabeled objects in the set and iteratively generating a new hypothesis in which a new boundary between representations of objects predicted as having negative labels and representations of objects predicted as having positive labels converges towards an original boundary between the representations of the initial positively labeled objects and the rest of the objects in the set. With the trained classifier system, labels are predicted for unlabeled objects in the set of objects.

DETAILED DESCRIPTION

Figure 1:
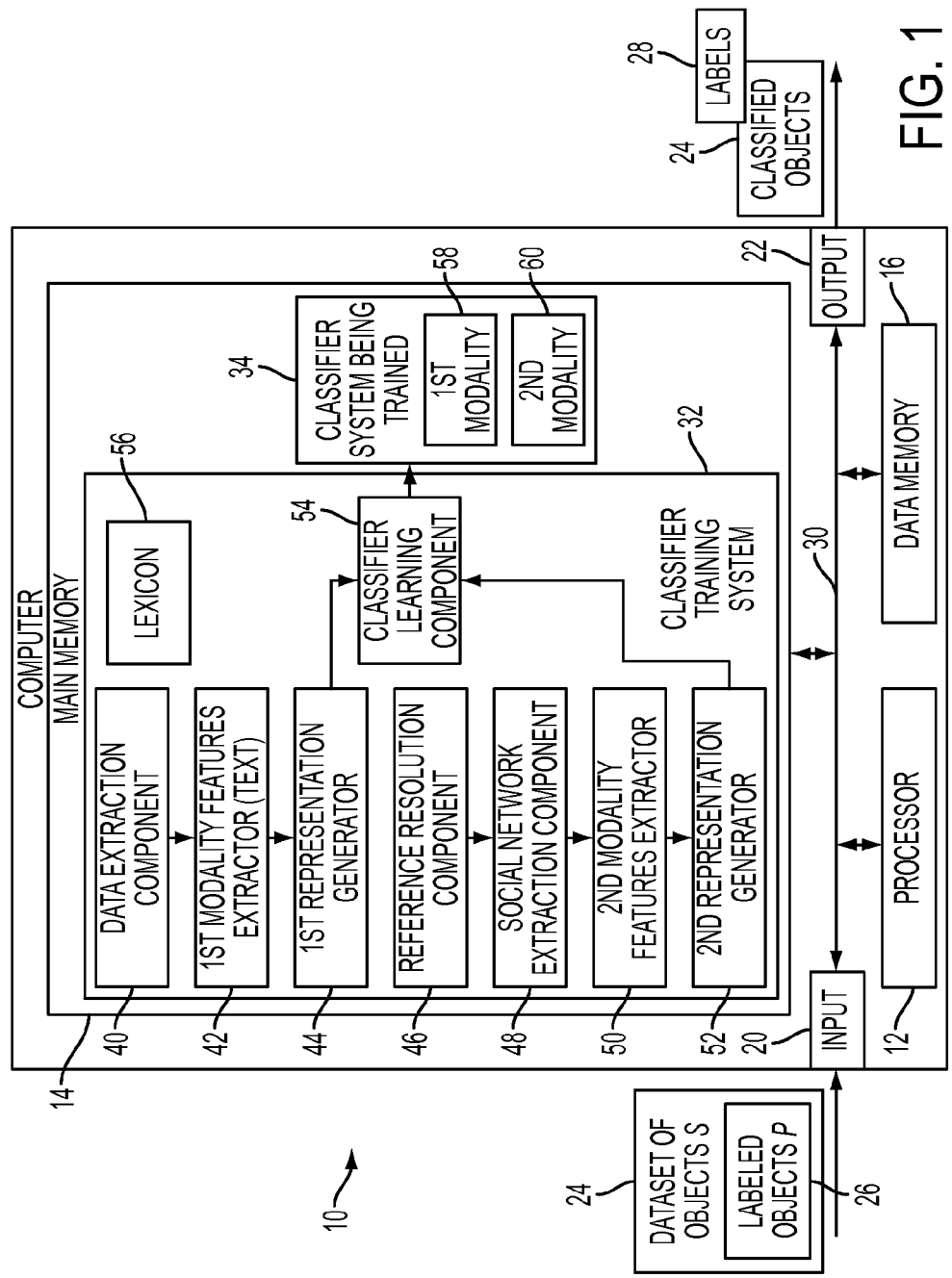
FIG. 1 is a functional block diagram of an apparatus for training a multimodality classification system in accordance with one aspect of the exemplary embodiment.

Aspects of the exemplary embodiment relate to a method and apparatus for improving classification performance in a one-class setting by combining classifiers of different modalities. In the following, the term "multi-modality" is used to refer to a combination of different levels of description to aid classification tasks.

The method is particularly suited to classification of a large corpus of electronic mail messages, such as e-mails, text messages (SMS), and other electronic documents which include references to the sender and receiver. By way of example, the problem of distinguishing responsive documents in a corpus of e-mails is used to demonstrate the method. However, the same principles are applicable to similar classification problems where collaborators working on a set of documents can instantiate social features (available as a result of collaborative edition, version control, and/or traceability in a document processing system).

The method provides a way to turn the social network that is implicit in a large body of electronic communication documents into valuable features for classifying the exchanged documents. Working in a one-class setting, a semi-supervised approach, based on the Mapping Convergence framework, may be used. An alternative interpretation, that allows for broader applicability by dismissing the prerequisite that positive and negative items must be naturally separable, is disclosed. An extension to the one-class evaluation framework is proposed, which is found to be useful, even when very few positive training examples are available. The one-class setting is extended to a co-training principle that enables taking advantage of the availability of multiple redundant views of the data. This extension is evaluated on the Enron Corpus, for classifying responsiveness of documents. A way to turn the social network that is implicit in a large body of electronic communication into valuable features for classifying the exchanged documents is also disclosed. A combination of text-based features and features based on this second extra-textual modality has been shown to improve classification results.

In the exemplary embodiment, the multi-modality of e-mail is used for classification. E-mail not only includes text, but it also implicitly instantiates a social network of people communicating with each other. Document representations modeling these distinct levels are constructed, which are then combined for classification. This involves an integration of different aspects, such as the topic of an e-mail, the sender, and the receivers. Classifying with respect towards responsiveness is used as an example (in this case, whether or not the message is of relevance to a particular litigation matter).

An algorithm developed for use in the method is specifically aimed at classifying items based on a very small set of positive training examples and a large amount of unlabeled data. However, the method also finds application in situations where both positive and negative labeled samples are available.

With reference to FIG. 1, an apparatus for classification of electronic data objects, such as e-mails, is illustrated, in the form of a digital processing device, such as a computer 10. The computer 10 includes a digital processor 12, such as the computer's CPU, and associated memory, here illustrated as main memory 14 and data memory 16. The digital processor 12 can be variously embodied, such as by a single-core processor, a dual-core processor (or more generally by a multiple-core processor), a digital processor and cooperating math coprocessor, a digital controller, or the like. The digital processor 12, in addition to controlling the operation of the computer 10, executes instructions stored in memory 14 for performing the method outlined in FIG. 2.

The computer 10 may include one or more dedicated or general purpose computing devices, such as a server computer or a desktop or laptop computer with an associated display device and a user input device, such as a keyboard and/or cursor control device (not shown).

The memories 14, 16 may be separate or combined and may represent any type of computer readable medium such as random access memory (RAM), read only memory (ROM), magnetic disk or tape, optical disk, flash memory, or holographic memory. In one embodiment, the memory 14, 16 comprises a combination of random access memory and read only memory.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated computer 10 includes an input interface 20 and an output interface 22, which may be combined or separate. Interface 20 receives a dataset of electronic data objects 24 to be classified. A portion 26, typically only a small portion, of the objects in the dataset 24 has been labeled according to class. Interface 22 outputs predicted labels 28 for unlabeled data objects. Exemplary input and output interfaces include wired and wireless network interfaces, such as modems, or local interfaces, such as USB ports, disk drives, and the like. Components 12, 14, 16, 20, 22 of the computer are communicatively interconnected by a data/control bus 30.

The computer 10 is configured by suitable programming or hardwired firmware to embody a classifier training system 32 for training a classifier system 34. The exemplary training includes assigning values to parameters of a one class classification algorithm for classifying unlabeled objects as responsive (in the class) or not. In the exemplary embodiment, classifier training system 32 and classifier system 34 may be embodied in software instructions stored in memory 14 and executed by processor 12.

The classifier training system 32 operates on a dataset 24 comprising a suitable number of labeled training objects 26. The labels represent a priori information about the classifications of the images, such as manually applied class labels. For a hard binary classification, the labels can, for example, be "+1" if the object is assigned to the class and "−1" otherwise. For a soft binary classification, the labels can, for example, be values in the range [0,1] indicating likelihood of membership in the class.

The classifier training system 32 may be embodied in software, hardware or a combination thereof. In the exemplary embodiment, system 32 includes various software modules 40, 42, 44, 46, 48, 50, 52, 54 executed by processor 12, although it is to be appreciated that the modules may be combined and/or distributed over two or more computing devices. A data extraction component 40 extracts text content of the objects in the data set and in particular, the content of an electronic message body as well as the content of header fields. A lexicon 56 is generated by the extraction component from the extracted text content and may be stored in memory, such as main memory 14 or data memory 16.

A first features extractor 42 extracts text-based features from the extracted text content, in particular from the email body. A representation generator 44 generates a representation of each object 24 (e.g., a features vector) based on the extracted text-content features. A reference resolution component 46 resolves references in the objects to actors (people) in a social network of actors responsible for sending and receiving the electronic messages in the data set. A social network extraction component 48 generates a graph in which actors are represented by nodes and electronic mail traffic between actors is represented by edges, each edge labeled with a number of electronic mail messages in a given direction. A second features extractor 50 extracts features for each of the electronic mail messages 24 based on sets of features assigned to the sending and receiving actors of that message. The actors' features are based, at least in part, on the email traffic between actors in the network and are selected to reflect the actor's relative importance in the social network.

The text-based representation and social network-based representation generated for each object 24 are input to a classifier learning component 54 which trains classifiers 58, 60 of classification system 34 for the respective modalities. The classification system combines the output of the classifiers to identify a classification boundary, whereby objects predicted to be within the class can be labeled with the class label, e.g., "responsive," and objects outside the class can optionally also be labeled accordingly (e.g., as non-responsive).

While the exemplary system 32 has been described with reference to two modalities—text and social networks, it is to be appreciated that more than two modalities and/or different types of modality are also contemplated.

Figure 2:
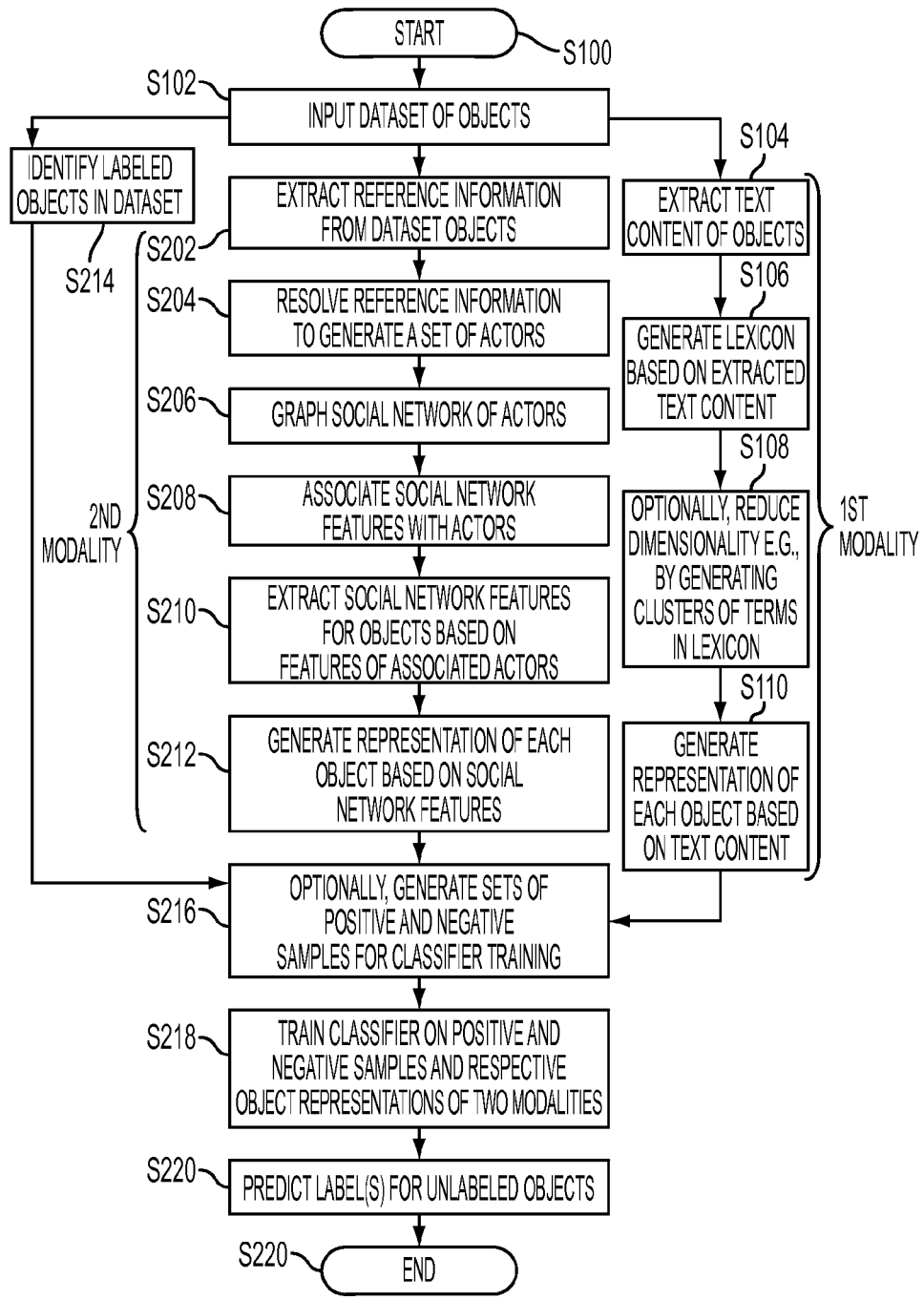
FIG. 2 is a flow diagram illustrating a method for training and using a multimodality classification system in accordance with another aspect of the exemplary embodiment.

With reference to FIG. 2, a computer-implemented method which may be performed with the apparatus of FIG. 1 is shown. The method, details of which are described in greater detail below, begins at S100.

At S102, a dataset 24 of S objects is input and may be stored in computer memory 16 during processing. The dataset may be preprocessed to remove duplicate objects.

In the following steps, representations of the objects are generated in n different modalities, based on features extracted from the input objects, where $n \geq 2$. In the exemplary embodiment, two modalities are used: text-based and social network-based. In the first modality, the features may be based on textual content and the method may proceed as follows:

At S104, textual content is extracted for each object 24. In the case of e-mails, the textual content may be extracted from the subject (title) field, the body of the e-mail (i.e., the message) and optionally also from any text attachments.

At S106, a lexicon 56 is generated, based on the textual content of all the e-mails in the dataset.

At S108, the lexicon 56 can be processed to reduce its dimensionality. For example, very frequently used words (such as "the" and "and") and/or words below a threshold length can be excluded from the lexicon. Additionally, words can be grouped in clusters, based on semantic similarity, or by automatically applying co-occurrence rules to identify words used in similar contexts.

At S110, a representation is generated for each object 24, based on the text content. This can be in the form of a bag-of-words or bag-of-clusters representation (collectively referred to as bag-of-terms representations). In this model, text content is represented as an unordered collection of words/word clusters, disregarding grammar and even word order. The representation can thus be a histogram (which can be stored as an optionally normalized vector) in which, for each word (or, more generally, each term) in the lexicon, a value corresponding to the number of occurrences in the object is stored. The first modality (textual content) representation for each object can be stored in memory 16.

The generation of the second modality (social network) representations can proceed before, after, or contemporaneously with the generation of the first modality representations of the objects. The social network representations of the objects aim to capture the hidden social network of actors sending and receiving the objects (e-mails) 24 by graphing a social network in which nodes represent actors and links between actors represent the e-mail communications between the actors.

At S204, reference information (information referring to actors) is extracted from the relevant fields of the e-mail, such as the "to", "from", "cc" and "bcc" fields. The signature within the e-mail body may also provide reference information concerning the sender.

At S206, the reference information is resolved, to generate a set of actors. Since e-mail addresses are not uniform, the reference resolution step involves associating references to the same person to a common normalized form—a single actor.

Figure 3:
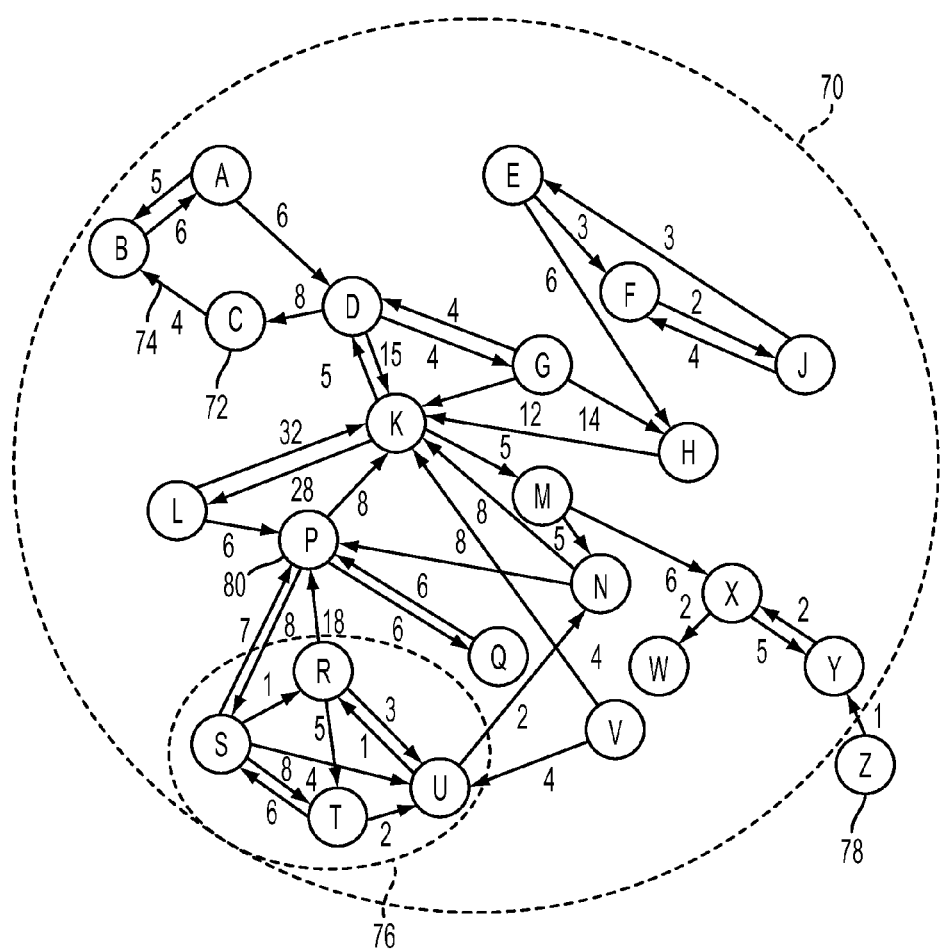
FIG. 3 illustrates a social network graph.

At S208, the set of actors generated at S206 and the e-mail communications between them are graphed. An example social network graph is illustrated in FIG. 3. As will be appreciated, the graph may be stored in memory as a data structure in any suitable form. Actors who send and/or receive fewer than a threshold number of e-mails can be eliminated from the network 70.

At S210, for each actor 72 in the network 70, social network features are extracted from the graph and associated with the respective actors. The graph allows various features to be extracted which provide information about the actors, such as whether they belong to a cluster 76 of actors (each actor in a cluster has sent or received e-mails from every other member of the cluster), whether the actor is a hub 80 (sending and/or receiving e-mails from at least a threshold number of other actors), the number of e-mails sent by/to the actor, and the like. Twelve social network features are described below, by way of example. It is to be appreciated that the method is not limited to any particular set of social network features. However, in one embodiment, at least two social network features are extracted, and in another embodiment, at least four or at least six different social network features are extracted for each actor. The extracted social network features can be normalized and/or weighted and combined to generate a features vector for the respective actor.

At S212, social network features are extracted for the objects, based on the features extracted for the corresponding actors (senders and recipients). In this way, the social network features for the actors are propagated to the e-mails 24 between them. The result is a social network features representation (e.g., in the form of a vector) for each object.

At S214, the labeled objects 26 in the data set are identified. In the exemplary embodiment, only positive (relevant objects) may be available. In this case, a negative set of objects may be generated (S216) by identifying unlabeled objects with feature vectors that are dissimilar from the set of feature vectors belonging to the labeled objects 26. These can be the objects which are used to train the classifier system (S218). In the exemplary embodiment, the sets of objects to be used as positive and negative samples are expanded through an iterative process.

In one embodiment, the two features vectors (text and social network features vectors) can be combined to generate a single D-dimensional vector for each object which is input to a single classifier. In the exemplary embodiment, however, two classifiers 58, 60 are trained, one using the first modality object representations and the other using the second modality object representations. In predicting a class/label 28 for an unlabeled object, the output of the two probabilistic classifiers 58, 60 is combined. Two methods of combining the classifier outputs are proposed, which are referred to herein respectively as naïve combination and co-training combination.

At S220, the trained classifier system 34 is used to predict the labels 28 for unlabeled objects, based on their vector representations. The corresponding objects for the set labeled positive can then be subjected to a manual review.

The method ends at S222.

As will be appreciated, the number n of object modalities used to generate representations may be more than 2. Other representations of the documents 24 are also contemplated.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for training and/or using the trained classifier described herein.

The method illustrated in FIG. 2 may be implemented in a computer program product or products that may be executed on a computer. The computer program product may be a tangible computer-readable recording medium on which a control program is recorded, such as a disk, hard drive, or the like configured for performing the method. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. The computer program product may be integral with the computer 10, (for example, an internal hard drive or RAM), or may be separate (for example, an external hard drive operatively connected with the computer 10), or may be separate and accessed via a digital data network such as a local area network (LAN) or the Internet (for example, as a redundant array of inexpensive or independent disks (RAID) or other network server storage that is indirectly accessed by the computer 10, via a digital network). Alternatively, the method may be implemented in a transmittable carrier wave in which the control program is embodied as a data signal using transmission media, such as acoustic or light waves, such as those generated during radio wave and infrared data communications, and the like.

Various steps of the method will now be described in greater detail.

Preprocessing Duplicates (S102)

Since both senders and one or more recipients of e-mails may store an e-mail message, duplicate messages may exist and may be pruned from the dataset. Identical messages may be identified based, for example, on the content of the subject (title) field and a digest of the body.

Extraction of Text Content (S104)

The exemplary objects 24 are e-mails in electronic form; accordingly, extraction of the text content of each of the fields is readily achieved using associated metadata. For scanned documents, OCR processing may be applied to the scanned images.

Generation of a Lexicon (S104)

To be able to construct bag-of-terms representations later, a lexicon 56 is derived from the total collection of messages. A word list and word frequency table are constructed from the bodies of the messages 24. A number of criteria may be applied to filter some of the terms from the resulting lexicon. For example, strings of length smaller than a threshold, such as less than three characters, are excluded from the lexicon. A minimum threshold of occurrence may be established (e.g., a minimum of 4 occurrences in the entire corpus). This is premised on the expectation that the words that occur more frequently in documents are likely to carry more information. Words which do not meet the threshold are excluded from the lexicon. A Porter stemmer can be applied to reduce all words to a normalized form, and all words may be lower-cased.

Another other way of reducing the dimensionality of the lexicon 56, and the resulting vector representations, is by clustering features semantically. A soft clustering approach may be used, as described, for example, in Julien Ah-Pine and Guillaume Jacquet, *Clique-based clustering for improving named entity recognition systems*, in EACL, pages 51-59 (2009). Maximal cliques in a co-occurrence graph are clustered to obtain a score indicating the probability a word belongs to each cluster. Words which have a threshold probability are assigned to that cluster. Ambiguous words, which have a threshold probability of belonging to two or more clusters can be assigned to more than one cluster and thus can contribute to multiple features in the features vectors. The vectors produced by using features generated by a clustering technique are described herein as bag-of-clusters representations. Each feature represents a certain semantic field, but words grouped together in a cluster need not all have the same meaning. Each cluster has an identifier, which can be a numerical identifier of a word from the cluster.

Reducing the dimensionality can sometimes improve the performance of a one class classifier by reducing noise. However, it is to be appreciated that there is a chance that certain infrequent words may contain key information and thus recall may be reduced if the lexicon 56 is reduced to too great an extent. In the exemplary embodiment, a large feature set was found to provide higher performance.

The result of the filtering is a lexicon 56 having a dimensionality corresponding to the number of words or clusters (which will both be referred to herein as "terms") it contains.

Textual Content Representation

One level of representation particularly relevant to the distinction responsive/non-responsive is the textual content of the objects. For example, a bag-of-terms representation is generated for each e-mail from the contents of the e-mail's body and subject fields. This allows a vector to be constructed where each feature represents a term of the optionally filtered lexicon 56 and the feature values express a weight which may be based on frequency of occurrence in the object or other occurrence-based value.

From the lexicon 56, vectors are generated, with each feature representing one term. For the values, various parameters can be used, such as tf-idf frequency, and binary values. The document frequency df of a term w is the number of documents (objects) in which it occurs. The term frequency tf is the number of times the term occurs in a document d. S is the number of documents:

$$\text{binary}(w, d) = \begin{cases} 1 & \text{if } w \text{ occurs in } d \\ 0 & \text{otherwise} \end{cases}$$

$$\text{frequency}(w, d) = tf$$

$$tf - idf(w, d) = tf \cdot \log(S/df)$$

The values in the textual content vector used to represent an e-mail can include any one or an optionally weighted combination of these parameters.

Choice of Classifier

While a variety of classifier learning methods may be used for text as well as social network features, such as support vector machines (SVM), naïve Bayes, and neural networks, the feature set based on a bag-of-terms representation has some properties that make it particularly suited for SVM classification with a linear kernel (see, for example, Thorsten Joachims, *A Statistical Learning Model of Text Classification for Support Vector Machines*, In Proceedings of the 24th Annual International ACM SIGIR Conference on Research and Development in Information Retrieval, pages 128-136, ACM Press, 2001).

First, the feature set is very high-dimensional, even if dimensionality is reduced by the techniques described above. Second, the vectors are very sparse, because only a small number of the terms actually occur in each respective document. Third, the terms that do occur in documents may have a considerable overlap, even if the documents belong to the same category. Fourth, there is a lot of redundancy in the feature vector: a document typically has a large number of cues that signal a particular classification. Given the sparsity of the feature vectors, with one-class based SVM algorithms, a linear kernel is appropriate, although other methods such as Gaussian kernels are also contemplated.

Social Network Representation

Another representation of the object is developed by deriving an implicit social network based on the assumption that the e-mail communication between senders and recipients can implicitly provide information on the roles of senders and recipients of the message in the network of people exchanging information.

The structure of a large corpus of e-mail, such as that produced in response to discovery requests or otherwise uncovered during the course of litigation, clearly is not homogeneous. Where the e-mails are recovered, e.g., using forensic tools, from the computers of a group of key people in an organization which is a party in a civil lawsuit or criminal prosecution, they reflect the normal interactions between people in that organization, with some communications with people outside the organization. The lines of communication thus implicitly instantiate a network of actors. The exemplary method includes developing such a social network and assigning actors with features based on the communications with others, and propagating these features to the e-mails for which the actors are senders or recipients.

Resolving References (S204)

The first step is to identify references to senders/recipients (S202) and then resolve these references to generate a set of actors (S204). References to people in the electronic mail messages may be extracted from the email header, often in predefined fields tagged with metadata.

Ambiguities and inconsistencies among the references in the sender ("from") and recipient ("to, "cc", and "bcc"") fields may exist. These references may be names, coming from the personal address book of the user (which is assumed not to be available). To be able to extract the implicit social network, these are matched to specific actors. There may be several references to the same actor. For example, 'Richard Smith,' 'Rick Smith,' 'Richard B. Smith,' 'richard.smith@abccorp.com,' 'rsmith@.ext.abccorp.com,' 'Smith-R,' etc., likely all refer to the same person.

Using regular expressions, firstname, lastname and, when available, e-mail address are extracted from all the references. Then, references that occur in the headers of the same message are reassembled. The premise is that often both a name and an e-mail address occur in the header, and the knowledge that a person 'Mark Jones' that has the e-mail address 'mj@abccorp.com' allows Mark Jones to be matched to the e-mail address with a certain degree of confidence.

Having recombined these different references, the next step is to relate them to the references in other messages. An "actor" is a collection of references that has been identified as pointing to the same person. The e-mail address is used as a primary cue. It can be assumed that if two references share an e-mail address, they likely refer to the same actor. Secondly, for each yet unidentified reference, a search is made for possible matches in the set of actors with the same last name, based on first name, prefix, middle name and/or nicknames (e.g., using a list of common English nicknames). Provided a group of similar references refer to at most one actor in the network, it can be assumed that all yet unidentified references refer to the same actor. As a result of these two steps, all different formats of Richard Smith's name are resolved as referring to the same actor.

Graphing the Social Network (S206)

A social network graph is generated by identifying connections (e-mails in either direction) between actors. FIG. 3 shows a simplified exemplary social network graph 70 in which nodes 72 (here labeled with the letters of the alphabet) each represent an actor and edges 74 (shown as one directional arrows) each represent a sender to recipient connection, labeled with the number of e-mails sent in that direction. As will be appreciated, a single e-mail can have many recipients, so can contribute to more than one connection. A threshold may be set on the number of e-mails on a connection for that connection to be retained in the social network graph 70. For example a threshold of two e-mails (e.g., one in each direction or two in one direction) can be used to make sure that the majority of the traffic is taken into account while discarding any accidental links with no or little meaning.

Due to the Zipf-like distribution of the connection strengths this reduces the number of actors to take into consideration considerably, without losing much relevant information. Actors which are no longer connected to any other are removed. For example, actor Z 78 with only one e-mail, may be excluded from the social network 70. The largest connected subgraph (which may account for about 95% of the actors) of this correspondence graph is then taken as the social network.

The resulting communication network 70 is a directed weighted graph G=⟨V,E⟩), with a finite set of vertices V (nodes) and edges E (communication links between two nodes) where weights are based on the number of emails on the edge.

Associating Features with Actors in the Social Network (S208)

Having established a social network 70, a set of features is associated with each of the actors (nodes) 72. A feature set is selected with the aim of representing the position of correspondents in the corporate network. Certain properties of nodes in a communication graph can serve very well for automatically detecting the social role of actors in the network 70 (see, for example, Ryan Rowe, German Creamer, Shlomo Hershkop, and Salvatore J. Stolfo, *Automated social hierarchy detection through email network analysis*, in WebKDD/SNA-KDD '07: Proceedings of the 9th WebKDD and 1st SNA-KDD 2007 workshop on Web mining and social network analysis, pages 109-117, New York, N.Y., USA (2007) published by ACM.

A group of social network features is selected which aim to represent, singly or in combination, key properties of actors, such as whether the actor belongs to one or more intra-communicating cliques, such as clique 76 in FIG. 3, whether the actor serves as a hub (see, for example, hub 80, where actor P has several outgoing edges), an authority (receiving incoming emails from many nodes), or whether the actor is central, with many paths between other actors passing through the actor's node. The features can be based, directly or indirectly, on e-mail traffic/connections within the social network 70. In the exemplary embodiment, at least some or all of the social network features assigned to each of the actors may be selected from and/or based on the following twelve features:

1. An Activity score: the number of e-mails sent (by the actor). This feature represents the activity of the actor in the network.

2. A Hub score: based on the number of outgoing connection lines from the actor's node.

3. An Authority score: based on the number of incoming connection lines to the actor's node.

Features 2 and 3 are representative of the authority that is assigned to a node by its peers. In social network theory, nodes with a high number of incoming edges from hubs are considered to be authorities. Nodes that are linked to a large number of authorities are considered to be hubs.

A range of different centrality measures have been proposed to model the position of the node in the network. These depend on an undirected unweighted version of the communication graph. The length of a path is the number of edges between two nodes. The shortest path between a pair of nodes in the graph is the path with the fewest number of intervening nodes. A Matlab library for working with large graphs may be used for the computation (see, David Gleich, MatlabBGL: a Matlab graph library, at www.stanford.edu/~dgleich/programs/matlab_bgl/, (2008)). For the following five centrality features, the distance $d_{st}$ from a node s to another node t (expressed as the number of edges connecting s and t) and the number $\sigma_{st}$ of paths from s to t are computed. The number of paths from s to t via node v (the actor's node) is denoted by $\sigma_{st}(v)$ 4. A Mean centrality:

$$C_M(v) = \frac{n}{\sum_{s \in V} d_{vs}};$$

where $d_{vs}$ represents the minimum distance between the actor's node v and another node s, V represents the set of all nodes, and n is the total number of nodes. The mean centrality of the actor is thus the total number of nodes divided by the sum of all distances between the actor's node v and each other node in the graph, i.e., is related to the average distance to any other node.

5. A Degree of centrality: $deg(v)=|s|(v,s) \in E$. The degree of centrality is thus the number of the outgoing actors from each node.

6. Neighborhood centrality:

$$C_B(v) = \sum_{s \neq v \neq t} \frac{\sigma_{st}(v)}{\sigma_{st}};$$

where $\sigma_{st}(v)$ represents the number of paths from s to t which pass through v (under the constraint that v cannot be s or t).

7. Closeness centrality:

$$C_C(v) = \frac{1}{\max_t d(v,t)};$$

where $\max_t d(v,t)$ represents the maximum distance, in edges, between the actor's node and all other nodes.

8. Stress centrality:

$$C_S(v) = \sum_{s \neq v \neq t} \sigma_{st}(v).$$

This is simply the sum of the number of paths from s to t which pass through v over all values of s and t (under the constraint that v cannot be s or t), i.e., each path must comprise at least two edges and two of the edges in the path are connected with v.

The next feature characterizes the connectedness in the direct neighborhood of the node:

9. Clustering coefficient:

$$C_L(v) = \frac{2|(s, t)|}{(deg(v)(deg(v) - 1))}; \quad (v, s), (v, t), (s, t) \in E.$$

deg(v) is the degree centrality of node v obtained from feature number 5 above. The clustering coefficient feature identifies how close v's neighbors are to being a clique. It is given by the proportion of links |(s,t)| between the neighbors divided by the number deg(v)(deg(v)−1)/2 of links that could possibly exist between them in an undirected graph.

As an example, consider node E in FIG. 3. Node E has only 3 neighbors (namely, H, F, and J), since these nodes are all no more than one edge away from node E. Therefore, for node E, deg(v)=3. The number of possible links just between these 3 neighbors is between 0 and, by simple enumeration, deg(v) (deg(v)−1)/2=3*2/2=3. The actual number is |(s,t)|=1 (only F and J are linked). Then dividing 1 by the maximum link number 3, the clustering coefficient of E is equal to 0.3333.

For the following group of features, cliques are identified. There are groups of nodes in which each of the nodes is connected by at least one edge to every other node in the clique, as illustrated by clique 64 in FIG. 3. The cliques in the social network graph can be identified automatically, e.g., with a Matlab implementation (see, for example, Coen Bron and Joep Kerbosch, *Algorithm 457: finding all cliques of an undirected graph, in Communications of the ACM,* 16(9): 575-577 (1973). The minimum size of a clique may be specified, such as at least 3 nodes. Additionally, where one clique is fully included in a larger clique, only the maximal sized clique is used. A maximal complete subgraph (clique) is a complete subgraph that is not contained in any other complete subgraph (clique).

The following clique based features may be employed:

10. The number of cliques that an actor is in.

11. A raw clique score: for each clique the actor is in, a clique score is computed: a clique of size a actors is assigned a score of $2^{\alpha-1}$. The scores of all the cliques that the actor is in are then summed.

12. A weighted clique score: for each clique of size $\alpha$, with $\beta$ the sum of activities (e.g., from feature No. 1 above or a sum of emails sent and received) of its members, the actor is assigned a weighted clique score $\beta \cdot 2^{\alpha-1}$. The scores of all the cliques the actor is in are then summed.

Each of the feature scores can be scaled to a value in [0,1], where 1 indicates a higher importance. Thus for example, an actor may have a 12-value feature vector, such as [0.2, 0.1, 0.3, 0.2, 0.4, 0.1, 0.1, 0.5, 0.3, 0.2, 0.2, 0.1]. Each node can also be assigned an overall social score which can be a linear combination (sum) of these features, where all features have equal weight, i.e., 2.7 in the above example. In other embodiments, the features may be assigned different weights.

Generating Features for Objects (S210)

As will be appreciated, step S210 classifies the nodes (actors) in the social network with a set of features. The next step (S212) propagates the actors' features to the e-mails that have been sent and received by these actors. To translate the properties of actors to properties of e-mails, features from senders and recipients can be combined. For example, a set of 37 features is constructed to represent each e-mail. An e-mail is represented by three sets of 12 features (features 1-12 described above), the first set is the feature values of the sender node, the second set is the average of the feature values of all recipients of the e-mail, and the third is the feature values of the most prominent recipient. In this embodiment, the most prominent recipient is the recipient of the e-mail having the highest social score (obviously, if there is only one recipient, the second and third feature sets have identical values). The last feature is the number of receivers of that particular email.

It has been found that this set of 37 features, based on the social network implicit in the corpus, represents a quantification of the sender and recipient characteristics of each e-mail and provides valuable information in classifying the e-mail as responsive or not. Obviously, different sets of features of the sender and recipient(s) may be used.

In the exemplary embodiment, the 37 feature values are used as the social network representation of the e-mail (S112). In other embodiments, the features may be assigned different weights in generating the social network representation. There may also be fewer or more than 37 features for each email, such as at least eight features, e.g., including at least four sender-based features and at least 4 recipient-based features.

Classifier Learning and Classification (S218, S220)

In the exemplary embodiment, it is assumed that only positively labeled examples are available, with no negatively labeled samples. Support Vector Machines (SVMs) can be used for both the text-based and social network-based views of the objects. Traditionally, SVMs depend on multi-class training data. In the following, one method for generating a set of negative samples is described. It will be appreciated that if negative samples are available, this step is not necessary.

It is also assumed that only a small set of positively labeled e-mails are available and that the ratio between positive and negative objects in the corpus is unknown, but assumed to be unbalanced where the positives are the minority class. The positive items are assumed to be drawn from a certain distribution, whereas the negatives are everything else.

An exemplary SVM algorithm (Algorithm 1) for generating positive and negative samples is shown below which is suited to separate training of classifiers for the first and second modalities. Another algorithm (Algorithm 2) is then discussed as a method of co-training the two classifiers. The SVM-based algorithms are capable of constructing hypotheses based on positive trainings examples only. The algorithms employ a semi-supervised framework, referred to as Mapping Convergence, that not only looks at the positive examples, but is also supported by the large amount of unlabeled data that is available. In this approach, the first step is to obtain a small set of artificial negative examples from the set of unlabeled objects that have a high probability of being negative samples because their feature vectors (text and/or social network vectors) are highly dissimilar from the feature vectors of the positively labeled objects. The principles of mapping convergence are described in further detail in Hwanjo Yu, *Single-class classification with Mapping Convergence, Machine Learning,* 61(1-3):49-69, (2005).

A process of convergence can then proceed towards an optimal hypothesis.

Various types of kernel may be employed. For the text content classifier, a linear kernel was found to be effective. In training a linear classifier, the goal is to learn a class predictor $\hat{\gamma}$, given a D-dimensional vector x, of the form:

$$\hat{\gamma}(x) = a^T x + b \tag{1}$$

where a is a D dimensional vector of parameters, b is an offset parameter, and T denotes the transposition operator.

An objective of one-class SVMs is to create a hyperplane in feature space that separates the projections of the data from the origin with a large margin. The data is in fact separable from the origin, if there exists a normal vector w (perpendicular to the hyperplane) such that a kernel $K(w, x_1) > 0$, $\forall i$, where $x_i$ is an object representation—a point in space (a D-dimensional vector).

For the social networks classifier, a Gaussian kernel may be more appropriate than a polynomial kernel. For the special case of a Gaussian (Radial Basis Function, or RBF) kernel useful for the social networks representations, the following two properties guarantee this:

For $K(x_i, x_j) = e^{-\gamma \|x_i - x_j\|}$:

$$K(x_i, x_j) > 0 \,\forall i,j \quad (1)$$

$$K(x_i, x_i) = 1 \,\forall i \quad (2)$$

where $x_i$ and $x_j$ are data points (representations of two objects).

The $\gamma$ parameter controls the smoothness of the decision boundary. Where there is no sharp boundary between positives and negatives, a value of $\gamma$ between about 0.1 and 1.0 may be selected.

This results in all mappings being in the positive orthant and on the unit sphere and being much tighter than for other kernels. The connection between a One-class Support Vector Machine and binary classification is fairly strong. Supposing a parameterization $(w, \rho)$ for the supporting hyperplane of a data set $\{x_1, \ldots, x_l\}$, where $\rho/\|w\|$ represents the orthogonal distance from the hyperplane to the space origin 0, and $(,0)$ is the parameterization of the maximally separating hyperplane for the labeled data set:

$$\{(x_1+1), \ldots, (x_l+1), (-x_1-1), \ldots, (x_l-1)\}.$$

Also, suppose that a maximally separating hyperplane is parameterized by $(w,0)$ for a data set $\{(x_1,y_1) \ldots, (x_l,y_l)\}$ and with a margin, then the supporting hyperplane for $\{y_1 x_1, \ldots, y_l x_l\}$ is parameterized by $(w, \rho)$. For the non-separable case, margin errors in the binary setting correspond to outliers in the one-class case.

In the Mapping Convergence method, given a hypothesis h, items that are further from the decision boundary are classified with a higher probability. In other words: given a description of the volume where the positive training examples reside, items that are furthest away from it are taken to be most dissimilar to the positive items. Thus, artificial negative items are first created by labeling the ones most dissimilar to the positive training examples. At this stage $h_0$, all other samples are in a large volume bounded by a boundary which includes the positive examples.

This first approximation of the negative distribution serves as input for a converging stage to move the boundary towards the positive training examples. An SVM is trained on the positive training set and the constructed negatives. The resulting hypothesis is used to classify the remaining unlabeled items. Any unlabeled items that are classified as negative are added to the negative set. The boundary which most closely fits around the remaining samples thus converges towards the boundary around the known positive samples. The converging stage is iterated until convergence is reached when no new negative items are discovered and the boundary divides the positive and negative data points.

In the following algorithm, P represents the data set for the positively labeled objects. U represents the data set of unlabeled objects, which at the beginning accounts for the rest of the objects in the entire dataset S. Initially, the set of negatively labeled objects, N is an empty set.

At the beginning, a one class support vector machines classifier (OC-SVM) entitled $C_1$ provides the first hypothesis. Thereafter, for subsequent iterations, a SVM classifier $C_2$ which uses positive and negative data points takes over. For the first hypothesis $h_0$, $C_1$ is trained on the set of positives P to identify a small set of the strongest negatives $\hat{N}_0$ (e.g., less than 10% of U) from among the unlabeled dataset U. The rest $\hat{P}_0$ of the unlabeled dataset is considered positive. Thereafter, while the set of negatives $\hat{N}_i$ at iteration i is not empty, the second classifier is trained on the respective current P and N sets to produce a hypothesis in which the most negative data points in the remaining positive set are labeled negative.

---

Algorithm 1: Mapping Convergence

Require:
    positive data set P
    unlabeled data set U
    negative data set N=Ø
    OC-SVM: $C_1$
    SVM: $C_2$
Ensure: boundary function $h_i$
1.   $h_0 \Leftarrow$ train $C_1$ on P
2.   $\hat{N}_0 \Leftarrow$ strong negatives($\leq 10\%$) from U by $h_0$
     $\hat{P}_0 \Leftarrow$ remaining part of U
3.   $i \Leftarrow 0$
4.   while $\hat{N}_i \neq \emptyset$ do
5.   $N \Leftarrow N \cup \hat{N}_i$
6.   $h_{i+1} \Leftarrow$ train $C_2$ on P and N
7.   $\hat{N}_{i+1} \Leftarrow$ negatives from $\hat{P}_i$ by $h_{i+1}$
     $\hat{P}_{i+1} \Leftarrow$ positives from $\hat{P}_i$ by $h_{i+1}$
8.   $i \Leftarrow i+1$
9.   end while

---

Starting with an initial hypothesis which places the boundary between positive and negative data points at $h_0$, each new hypothesis $h_{i+1}$ maximizes the margin between $h_i$ and $b_p$ (the boundary for the known positive samples). At each new hypothesis, when the new boundary is not surrounded by any data, it retracts to the nearest point where the data resides.

The iteration process may be stopped prior to its natural completion to avoid the case where the boundary returns to $b_p$, which can happen if the gap between positive and negative data points is relatively small. A solution to the problem of over-iteration is finding the hypothesis that maximizes some performance measure. For example, to determine the optimal point to end the Mapping Convergence process, a graph may be plotted with the percentage of the entire data set returned on, the horizontal axis, and on the vertical axis, the approximate percentage of the actual positives that is found within that space (which may be estimated by identifying the number of labeled e-mails in all or a sample of the objects returned). An iteration number is selected when the approximate percentage of the positives begins to drop off dramatically with each further iteration. This approach involves identifying the point in the curve that excludes most of the data as negative, while keeping a large part of the positive data to be classified correctly. This may be after about 1-20 iterations, e.g., up to 10. The number of iterations may be different for the two types of classifier. In particular, the linear classifier used for text representations can reach an optimal point more quickly (fewer iterations) than the Gaussian classifier used for social networks representations.

As will be appreciated, if a small number of negative samples is available at the outset, the initial negative data set $N \neq \emptyset$ and the initial step of generating a small set of negative samples can be omitted.

Figure 4:
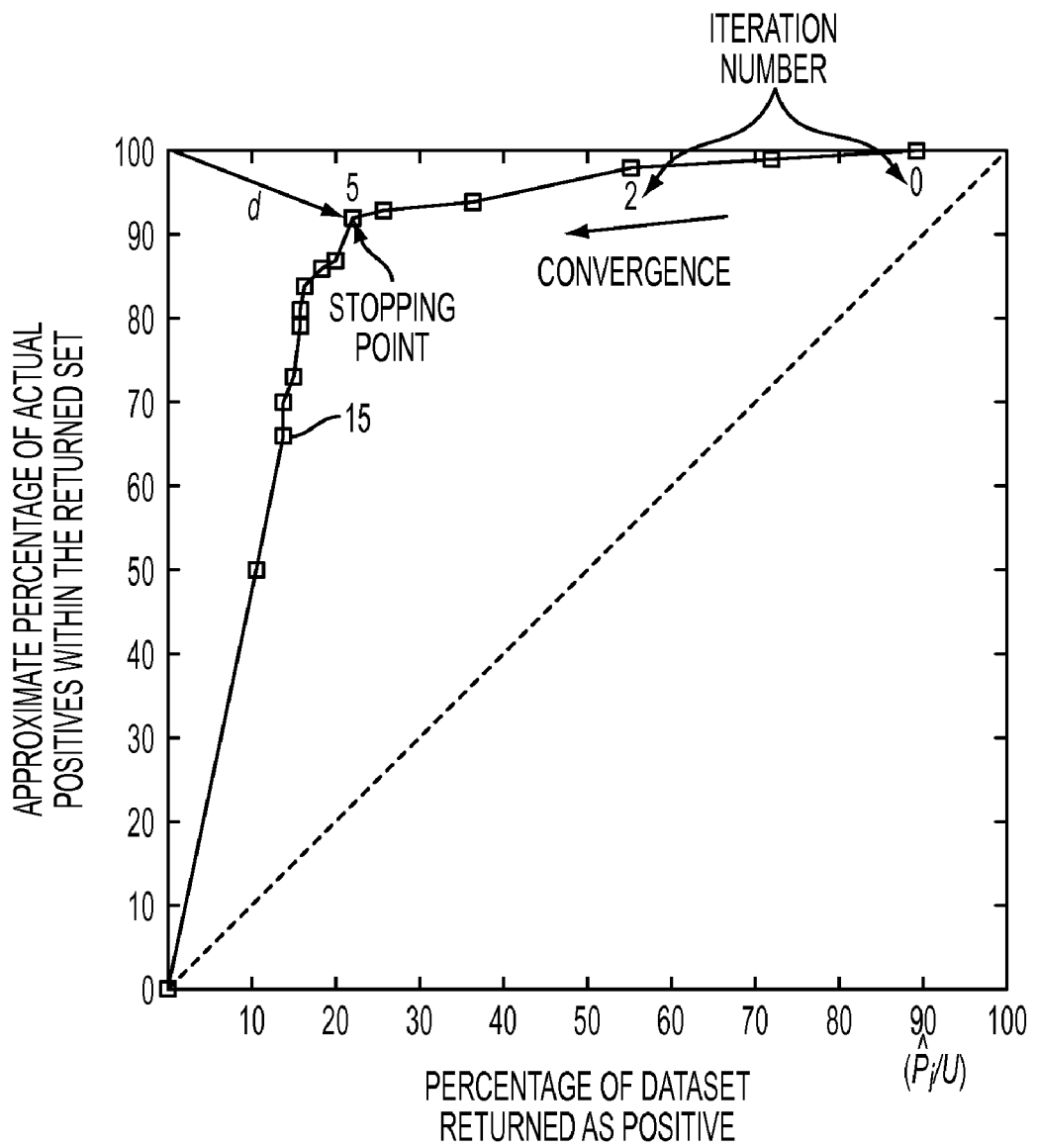
FIG. 4 a performance curve illustrating convergence for a set of random data in $\mathbb{R}^2$ which does not have a large gap between positive and negative data points.

To demonstrate the dynamics of the convergence, random data in $\mathbb{R}^2$ that also does not offer the large gap between positive and negative data was artificially generated. MC starts out a conservative hypothesis encompassing all the positive samples and most of the unlabeled data and converges to a solution taking into account the distribution of unlabeled data. In the first mapping stage, artificial negative items are created by labeling the ones most unsimilar to the positive training examples. This first approximation of the negative distribution serves as input for the converging stage to move the boundary towards the positive training examples. An SVM is trained on the positive training set and the constructed negatives. The resulting hypothesis is used to classify the remaining unlabeled items. Any unlabeled items that are classified as negative are added to the negative set. The converging stage is iterated until convergence, reached when no new negative items are discovered and the boundary comes to a hold. However, where there is no clear boundary between actual positives and negatives, then over-convergence can result, with boundaries being placed between clusters in the unlabeled data. A performance curve generated for the random data is illustrated in FIG. 4.

Figure 5:
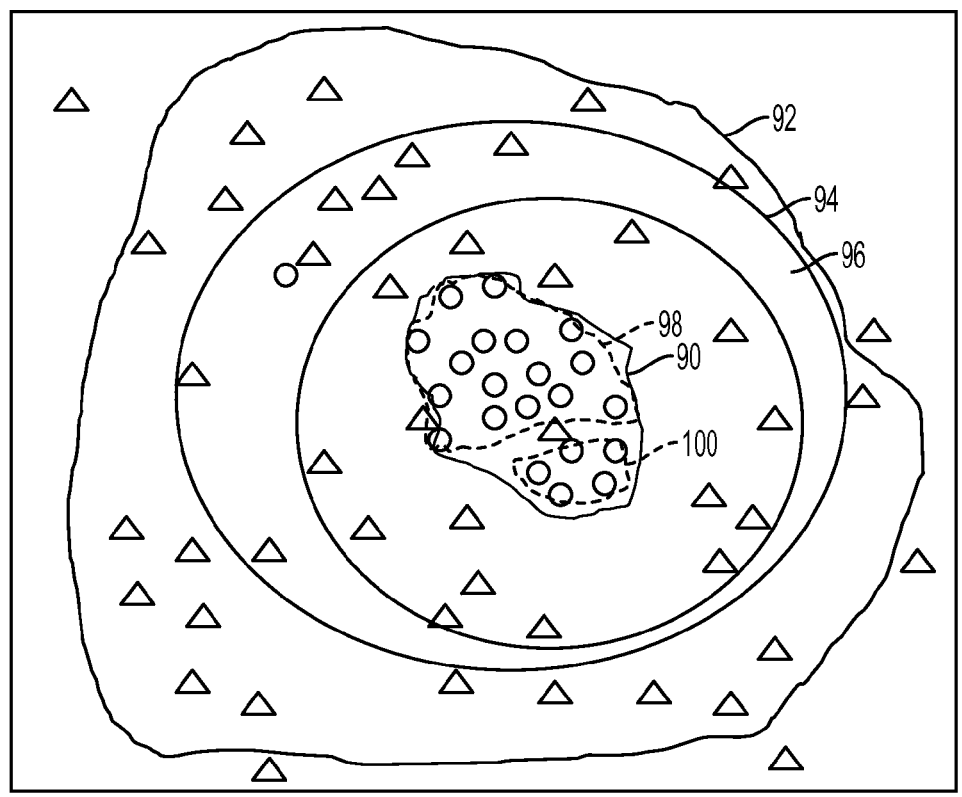
FIG. 5 schematically illustrates mapping convergence in two dimensions with positive data as circles and unlabeled data as triangles.

FIG. 5 schematically illustrates this in two dimensions with a set of labeled positive data shown by circles and unlabeled data by triangles. A tight boundary 90 around the known positives indicates the OC-SVM. The iterations start with a large percentage of the dataset returned as indicated by boundary 92 in FIG. 5 and the first square in FIG. 4 at the top right hand corner. Naturally, this large set contains all if not most of the true positives. It also contains a large percentage of what would be negatives, and is thus not very useful. As the iterations proceed, the number of data point returned as "positive" decreases, and some of the actual positives may be lost (outside boundary 94). The point on the curve that is closest to (0,100) may be considered to be optimal in terms of performance criteria, i.e., providing the best classifier with the parameters chosen (boundary 96). If the convergence is stopped on the fifth iteration, giving the classifier closest to the upper left corner of the plot, a fairly accurate description of the data may be obtained. If the iterations continue, over fitting may occur, as illustrated by boundaries 98 and 100.

The distance measure can be weighted to assign more importance to recall or precision. However, in one embodiment, the Euclidean distance d to (0,100) on the performance graph is used to identify the closest point at which to stop convergence. In another embodiment, the iteration number is selected to ensure that at least a threshold percentage, e.g., at least 90% or at least 95%, of the labeled positive data points are returned in the "positive" set.

There is also a trade-off in deciding how much data to label in the mapping stage. A bigger initial set of artificial negatives is more likely to cover the distribution of the negatives. However, putting too many data points in $N_o$ can result in poor performance because the effect will accumulate in convergence. In one embodiment, no more than about 5-10% of the data points are initially assigned to the negative set.

To improve the retention of actual positives in the set of returned "positives", a cross-validation step may be incorporated into the algorithm. Each step in Mapping Convergence process may be carried out with a split of the data into several folds, such as from four to ten folds (parts). Using a higher number of folds in the cross-validation reduces irregularities, but comes with a higher computational cost. For example, a 5-fold split over the positive data may be used. A hypothesis is trained on 4 of the parts, and a prediction is made on the remaining fifth part and the entire unlabeled set. This results in exactly one prediction per item in the positive set, and after aggregating the five predictions for the items in the unlabeled set, a single prediction is generated there too. This allows a solid estimate of the performance of the hypothesis to be obtained.

Other methods of assessing the performance at an iteration include fitting a logistic function to the output of an SVM to directly output the distance to the decision plane. This indeed is a measure of the confidence of the prediction. After scaling to (0,1) the predictions of multiple classifiers can be aggregated, for example by taking averages.

Combining the Multimodality Data

The discussion in the previous section focuses on obtaining a good performance from a single classifier, even when very little labeled data is available.

Combining different classifiers to improve overall performance is known as Ensemble Learning. Various ways are contemplated for incorporating the two modalities into a single overall classification. In a first, naive approach, the outputs of the two classifiers are combined. In a second approach, the MC algorithm is combined with co-training.

Naïve Combination

For example, one classifier is trained on the representations generated in the first modality and a second classifier is trained on the representations generated in the second modality. Both classifiers have classified all items in the test sets, but potentially have made errors. When one of the two has made an error, ideally, it can be corrected by the second. Since the classifiers each output a prediction, such as a number in (0,1) that represents the confidence, these predictions can be averaged over multiple classifiers. The classifier that is most certain will, in the case of an error, correct the other. In this approach, Algorithm 1 can be used to separately train two classifiers and the optimal combination of iterations of each of the two classifiers selected to produce a combined classifier, which is generally better than either one of the two classifiers.

Co-Training

Another embodiment of the MC algorithm (Algorithm 2) allows different classifier outputs to be into account on each of the iterative steps. In this embodiment, the different classifiers cooperate in a manner that resembles co-training (see, for example, Avrim Blum and Tom Mitchell, *Combining labeled and unlabeled data with co-training*, in *Proc. of the Workshop on Computational Learning Theory*, Morgan Kaufmann Publishers (1998)). At each step of the iteration, the more confident classifier (the one assigning the higher probability to a data point of being positive or negative) is able to overrule the other. The predictions of the two classifiers are aggregated by an aggregating function. In one embodiment, a fixed percentage of the unlabeled objects is labeled as negative. It is not necessary to continue labeling all data until convergence, only part of the data is needed: the part that both classifiers agree on to be negative.

In the following algorithm, P again represents the set of positively labeled objects. U represents the set of unlabeled objects, which at the beginning accounts for the rest of the objects in the dataset S.

---

Algorithm 2: Mapping Co-Convergence

Require:
    n views of the positive data set $P^{(1)}, ..., P^{(n)}$
    n views of the unlabeled data set $U^{(1)}, ..., U^{(n)}$ -continued Algorithm 2: Mapping Co-Convergence n views of the negative data set $N^{(1)} = \emptyset, ..., N^{(n)} = \emptyset$
OC-SVM: $C_1$
SVM: $C_2$
Aggregation function: Agg.
Ensure: boundary functions $h_i^{(1)}, ..., h_i^{(n)}$
1. $h_0^{(k)} \Leftarrow$ train $C_1$ on $P^{(k)}$     $\forall k \in [1,...,n]$
2. $pred_0^{(k)} \Leftarrow$ predict with $h_0^{(k)}$ on $U^{(k)}$     $\forall k \in [1,...,n]$
3. $\hat{N}_0^{(k)} \Leftarrow$ strong negatives ($\leq 10\%$) in $U^{(k)}$ by
    $Agg(pred_0^{(0)}, ..., pred_0^{(n)})$
    $\hat{P}_o^{(k)} \Leftarrow$ remaining part of $U^{(k)}$     $\forall k \in [1,...,n]$
4. $i \Leftarrow 0$
5. while $\hat{N}_i^{(k)} \neq \emptyset \; \forall k \in [1,...,n]$ do
6.    $N^{(k)} \Leftarrow N^{(k)} \cup \hat{N}^{(k)}$     $\forall k \in [1,...,n]$
7.    $h_{i+1}^{(k)} \Leftarrow$ train $C_2$ on $P^{(k)}$ and $N^{(k)}$     $\forall k \in [1,...,n]$
8.    $pred_{i+1}^{(k)} \Leftarrow$ predict with $h_{i+1}^{(k)}$ on $P_i^{(k)}$     $\forall k \in [1,...,n]$
9.    $\hat{N}_{i+1}^{(k)} \Leftarrow$ strong negatives ($\leq 5\%$) in $\hat{P}_i^{(k)}$ by
    $Agg(pred_{i+1}^{(0)}, ..., pred_{i+1}^{(n)})$
    $\hat{P}_{i+1}^{(k)} \Leftarrow$ remaining part of $\hat{P}_i^{(k)}$     $\forall k \in [1,...,n]$
10. $i \Leftarrow i+1$
11. end while There are several differences with Algorithm 1, discussed above, which may be noted. First, Algorithm 2 starts with more than one representation for the data objects, i.e., with n different views of them. In the exemplary embodiment, n=2, although it is to be appreciated that any number of modalities may be considered, such as 3, 4, 5, or more. In essence, Algorithm 2 is processing n different convergences simultaneously.

Second, the interaction takes place only by means of the aggregation function that combines the predictions and thus creates a filter that can be used to select the items to label. The exemplary aggregation function simply sums the respective predictions of the two $C_2$ classifiers. However, other aggregation functions may be used which take into account the two predictions, such as a function in which one classifier's prediction is weighted more highly than the other.

Third, in the convergence phase, not all items that are recognized as negative by one or both of the classifiers are added to the set of negatives N. Only the ones with the highest certainty (as determined by the aggregation) are labeled as negative, limited to a maximum of a certain percentage, here 5%, of the data set which, at the previous iteration, were classed as positive.

Without intending to limit the scope of the exemplary embodiment, the following example demonstrates the applicability of the method to a large dataset in which only a few positive examples are available.

Example

The Enron Corpus can be used to demonstrate improvements in classification performance in a one-class setting by combining classifiers of different modalities. Large bodies of documents, resembling the ones that are encountered when reviewing documents for corporate litigation, rarely appear in the public domain. Consequently, the Enron Corpus (EC) is, with respect to its sheer size and completeness, unique of its kind. Containing all e-mails sent and received by some 150 accounts of the top management of Enron and spanning a period of several years, the total number of messages is about 250,000. Almost no censorship has been applied to the contents, resulting in a vast variety of subjects ranging from business related topics to strictly personal messages.

Several attempts have been made to manually annotate parts of the Enron Corpus (e.g., Bekkerman, et al., *Automatic Categorization of E-mail in Folders: Benchmark Experiments on Enron and SRI Corpora, Technical Report IR*-418, *CIIR*, 2004). All of these are relatively small (several thousands of messages) and typically annotated with subject, emotional tone, or other primary properties. Annotation with respect to responsiveness is generally not publicly available.

For purposes of evaluation, the lists of government exhibits published on the website of the United States Department of Justice (DOJ) were used as an indicator of responsiveness. In particular, a set of 186 e-mails that has been used in Enron trials were assumed to be responsive, and were labeled as such, with the understanding that this likely represents only a small subset of responsive documents in the overall collection.

The original data set consists of about 600,000 text files, ordered in 150 folders, each representing an e-mail account. In these folders any original structure the user has created has been preserved. Even though the files are raw text, each contains separately the body and several of the e-mail header fields. Some preprocessing has been performed on the headers (e.g., in some places e-mail addresses have been reconstructed). Attachments are not included.

The Enron Corpus contains a large number of duplicate messages, ambiguous references to persons and other inconsistencies. The first step of preprocessing the 517,617 files in the database involves unifying identical messages based on title and a digest of the body, immediately reducing the number of messages by a little over 52% (248,155 messages remain).

In the reference resolution step, a total of 167,274 different references can be grouped as 114,986 actors. This includes a large number of references that occur only once and a small number of more central actors that are referred to in many different ways.

Figure 6:
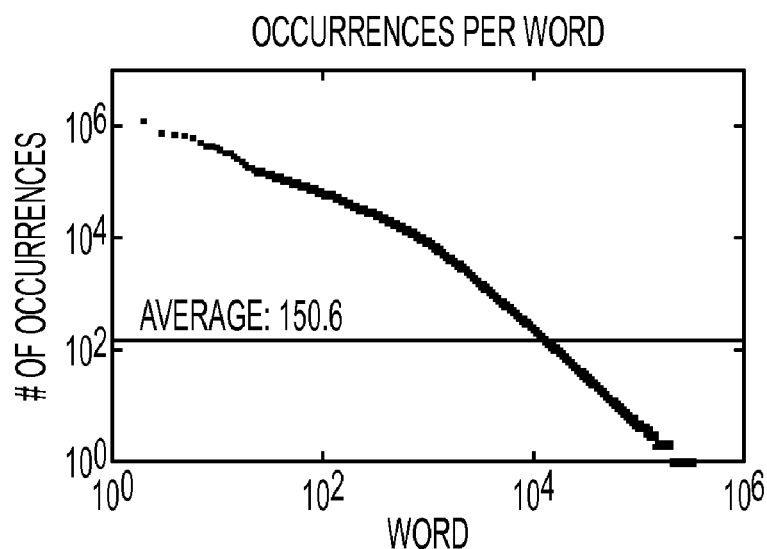
FIG. 6 is a plot of number of occurrences per word in the Enron corpus of e-mails.
Figure 7:
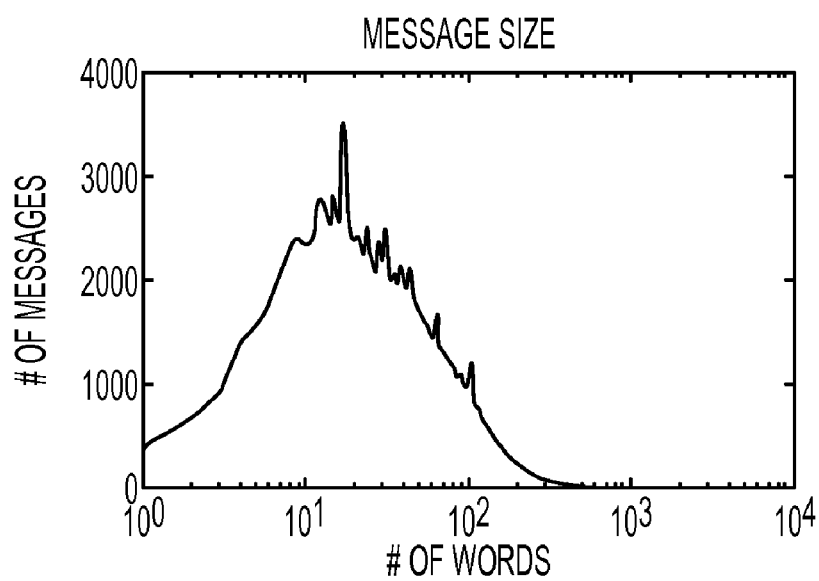
FIG. 7 is a plot of message size for the Enron corpus showing the number of messages for e-mail messages of a given word length.
Figure 8:
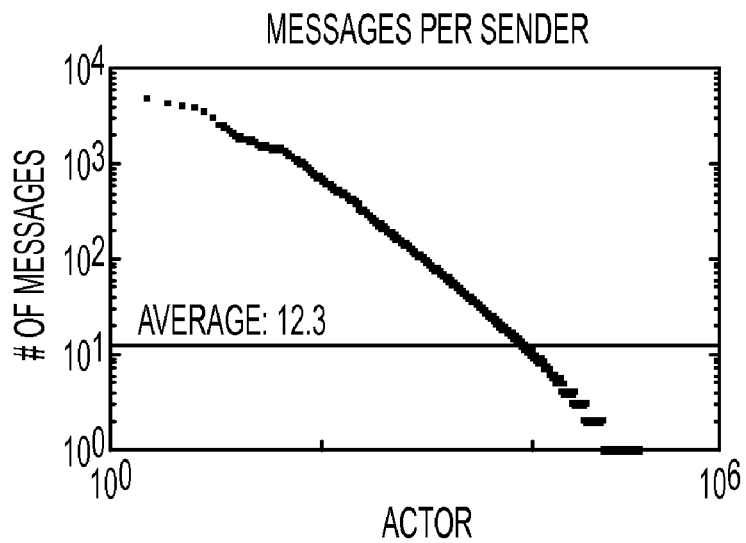
FIG. 8 is a plot of the number of messages per sender for the Enron corpus.
Figure 9:
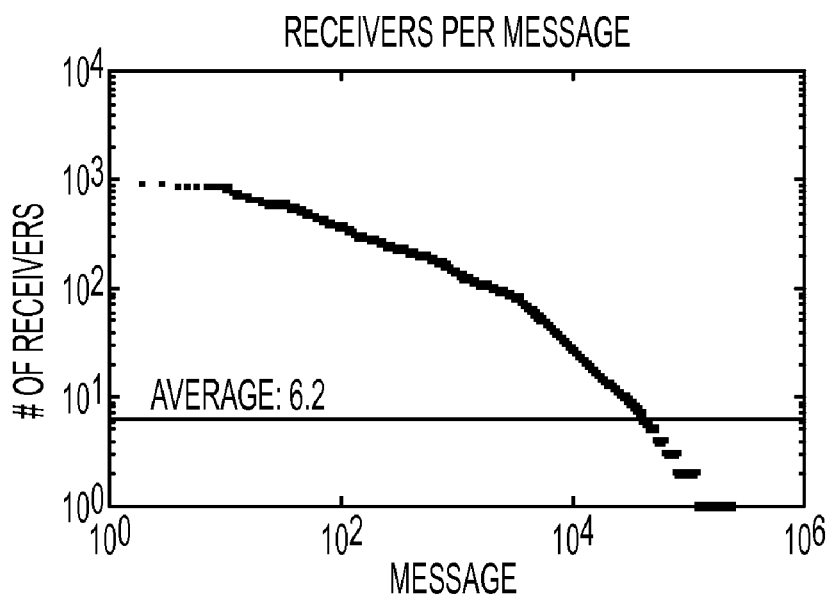
FIG. 9 is a plot of the number of receivers per message for the Enron corpus.
Figure 10:
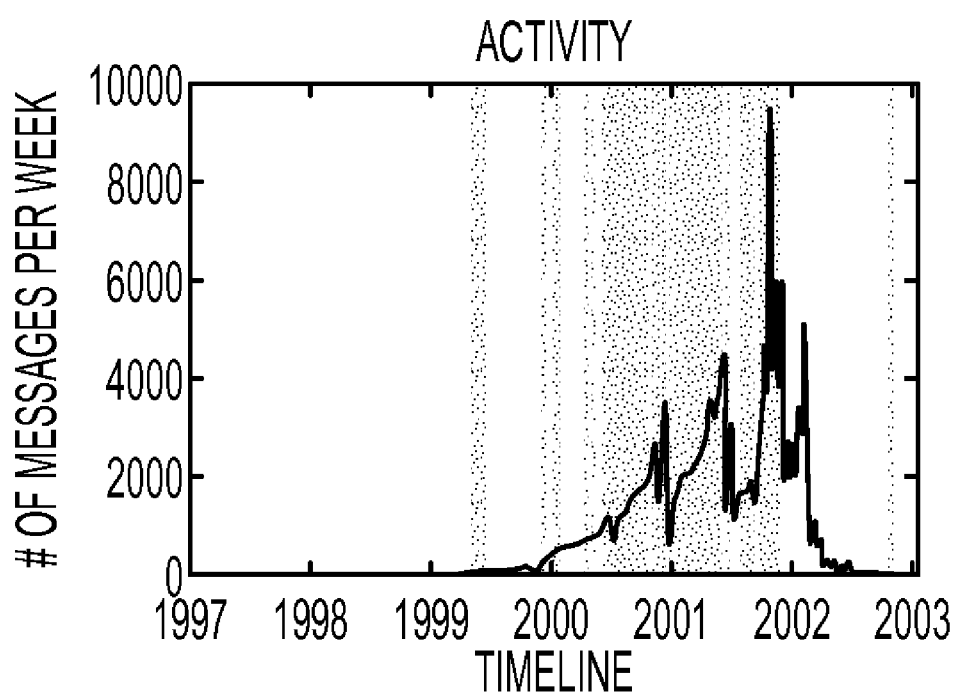
FIG. 10 is a plot of number of messages per week in the Enron corpus over a timeline of about 6 years with vertical lines indicating weeks for which a responsive e-mail was generated.

By setting a low threshold on activity, this number can be reduced dramatically. Some ambiguity and inconsistency may remain. For example, a considerable number of messages are found to have more than one sender. These errors are generally rare enough to be treated as noise. Plots characterizing the corpus are shown in FIGS. 6-10. In FIG. 6, as predicted by Zipf's law, the frequency of words is seen to be inversely proportional to their rank based on frequency. FIG. 7 shows the distribution of message sizes. The main peak is around 11 words, with most mass for lengths between 10 and 300 words. It is evident that the average e-mail is a relatively short text, one more reason to try to use other properties in classification. FIG. 8 shows that even though there are some very active actors in the network, most actors send very few e-mails. Similarly, as shown in FIG. 9, the number of recipients per message shows a Zipf-like distribution: there are some e-mails with a very large number of recipients (up to 1000), but most communications are aimed at a small group of recipients. FIG. 10 shows the number of e-mails per week that are sent over the timeframe of interest to the Enron Corpus. Vertical lines indicate that a message in the DOJ subset is in that week. It can be seen that the timestamps of e-mails on the exhibit list are clustered around crucial dates in the litigation.

In generating the lexicon, words of less than three words were excluded. Porter stemming, and lowercased words were used. The effect of reducing dimensionality by clustering was also evaluated. Clustering words into cliques, as described above, resulted in 6522 clusters. Other methods of reducing dimensionality were also evaluated, such as selecting the most important features (e.g., the top 1000 or top 500).

A framework was developed using the Python language using the LIBSVM library (see, Chih-Chung Chang and Chih-Jen Lin, *LIBSVM: a library for Support Vector*

*Machines,* 2001. Software available at www.csie.ntu.edu.tw/~cjlin/libsvm.) A linear kernel was used for the text-based feature sets and a Gaussian kernel was used with the social network-based sets.

Although Support Vector Machines are computationally not very expensive, for practical reasons, experiments were run on a subset of the corpus. In all experiments, the same set of 186 positive examples obtained from the DOJ exhibit list and 1,000 randomly selected unlabeled documents were used. For testing on the positives, 5-fold cross-validation was used. For testing on unlabeled items, 500 items were withheld. In this way, performance curves of the type shown in FIG. 4 could be generated.

Text and social network feature representations were generated for each e-mail, as described above. Parameters were adjusted to try to get the optimal settings of parameters to obtain good classifiers for use in combining their predictions.

Text Based Representations

Figure 11:
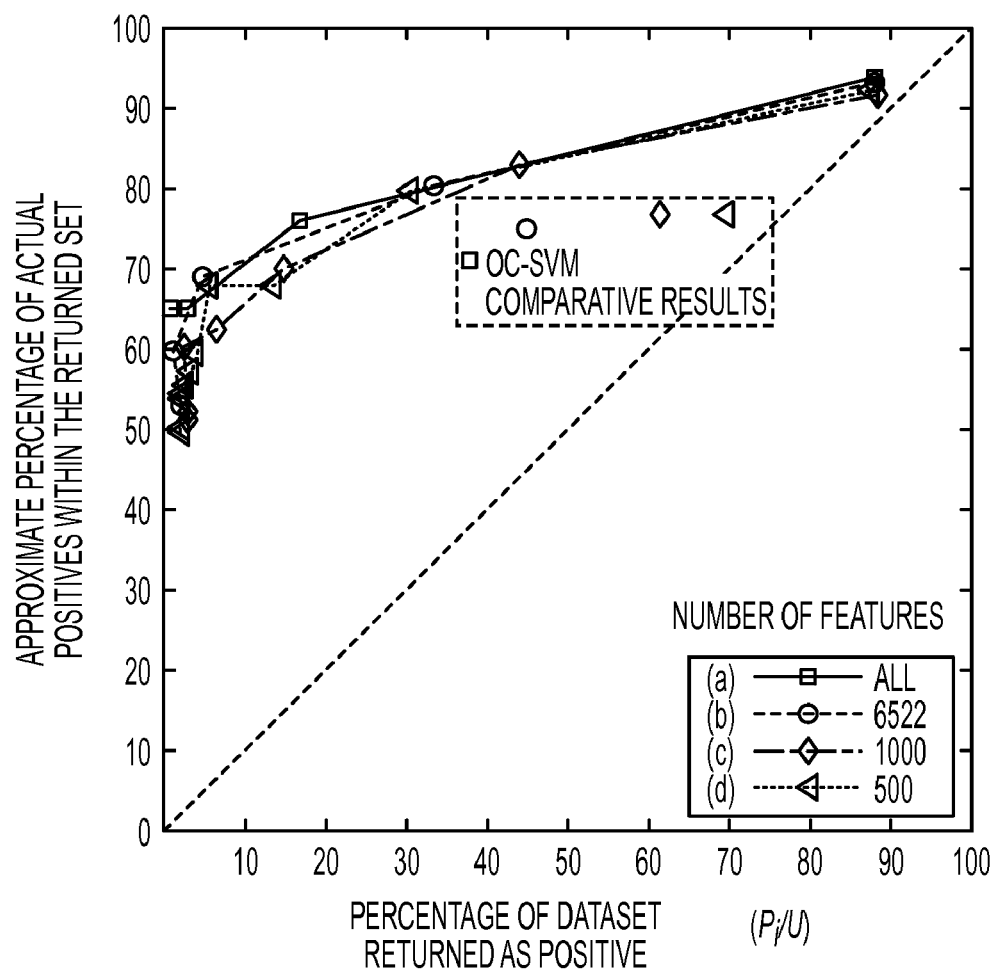
FIG. 11 is a plot illustrating the effect of number of text features on the performance of a text content classifier on the Enron corpus: (a) all features=the bag of words (bow) in the lexicon after removing words of less than 3 characters and porter stemming; (b) 6522—the terms produced by semantic clustering (sem), (c) 1000 terms-selected as being the most important features, and (d) 500 terms-selected as being the most important features; comparative results of a one class classifier without mapping convergence (OC-SVM) are also shown in this plot and in FIGS. 12 and 14-17.
Figure 12:
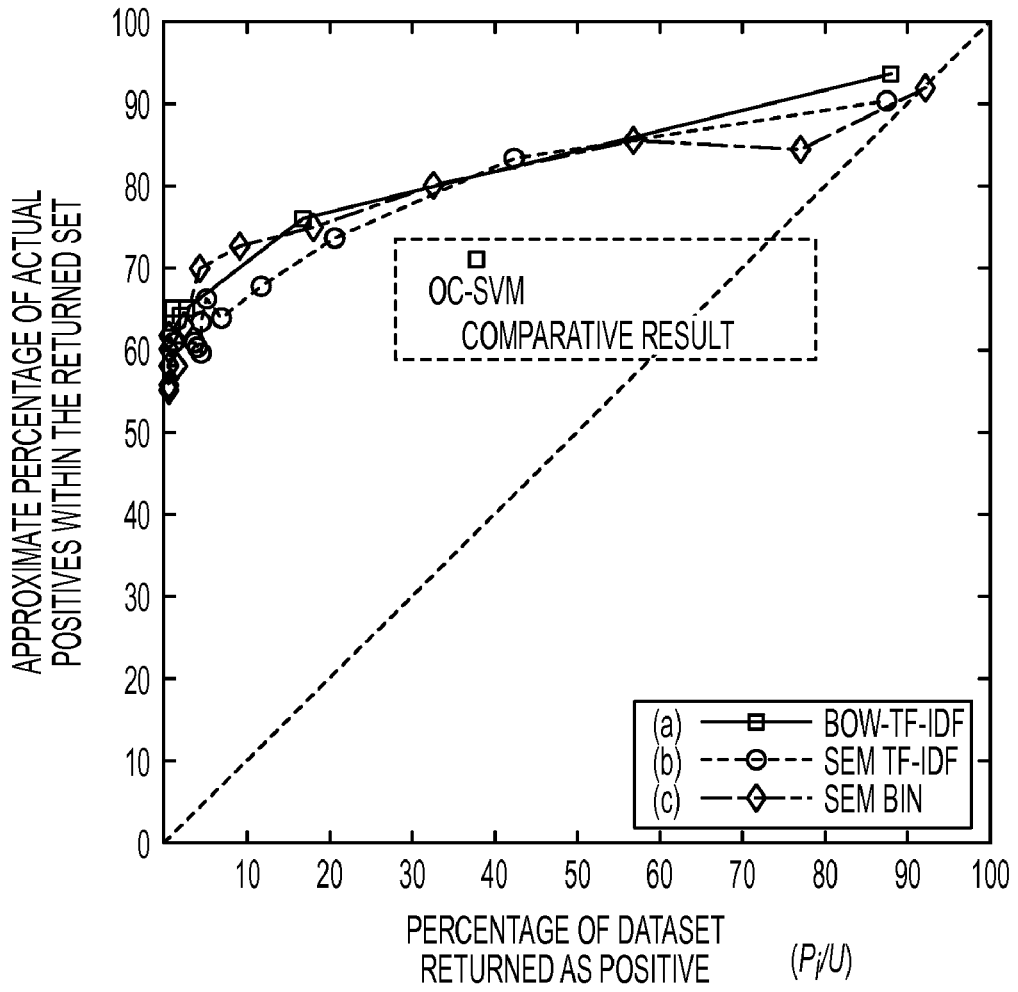
FIG. 12 is a plot illustrating the effect of feature value type on performance of a text content classifier on the Enron corpus: (a) the bag of words feature set (bow)-using all features, with td-idf as the type of feature value; (b) a bag of clusters feature set (sem), using 6522 terms generated by semantic clustering, with td-idf; and (c) the same bag of clusters feature set, with binary values (bin)

For the text-based representations, reducing the dimension of the feature space was found not to improve performance (FIG. 11). Even the OC-SVM performs considerably worse with less features. The convergence itself however was not hurt. Also the reduction of text features using semantic clustering does not seem to provide an improvement for this data set. Overall, the best and most stable performance was obtained using all features with tf-idf feature values. Binary and tf-idf values were found to give similar results, with tf-idf being slightly better and more stable. (FIG. 12).

Social Network-Based Representations

Figure 13:
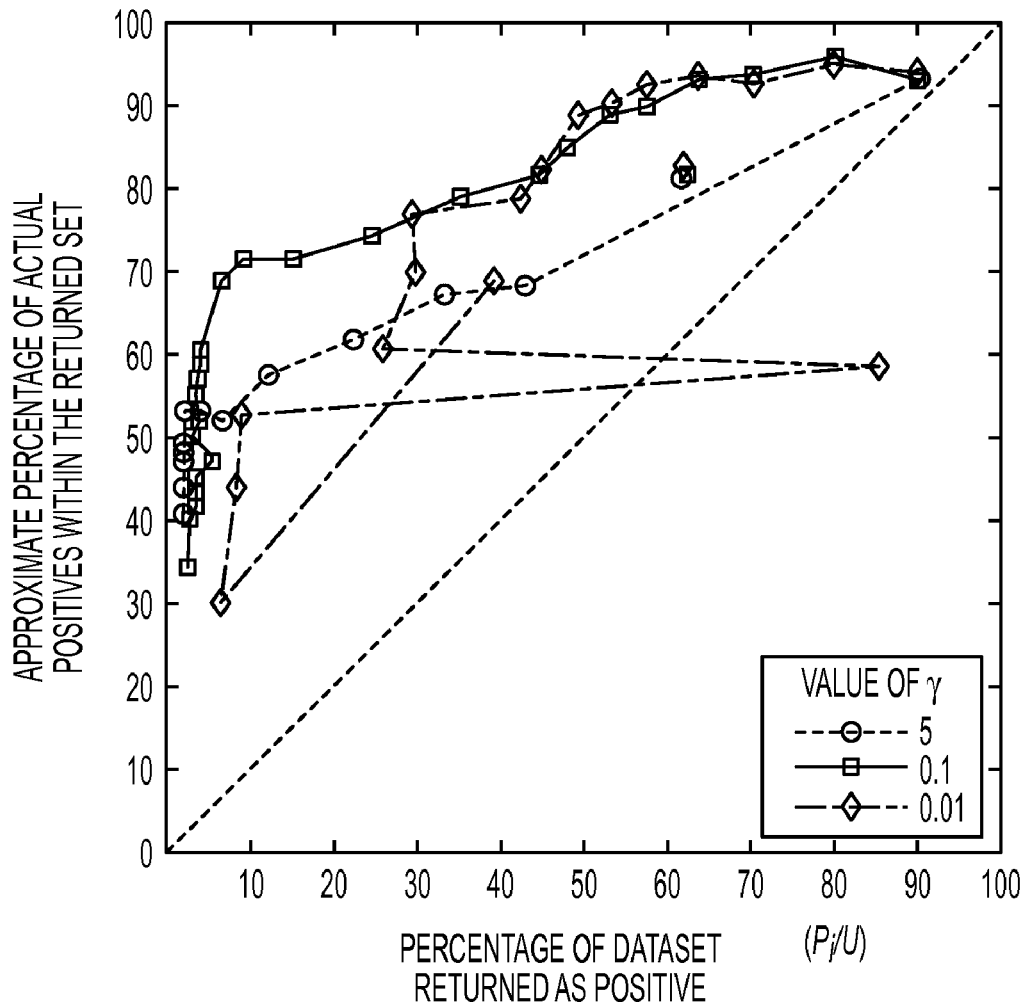
FIG. 13 is a plot illustrating the effect of γ on performance of a social networks content classifier on the Enron corpus.

FIG. 13 shows the effect of selecting different values of $\gamma$ Because of the different nature of the features used in the document representation based on the implicit social network, less tuning is needed. The feature values are fixed. No evaluation was made of the effect of reducing the number of features. For the Gaussian kernel, different values of the y parameter, which controls the smoothness of the decision boundary, were evaluated. The optimal value of y for the data set, from those tested, was found to be 0.1. Significantly larger values tend to lead to under-fitting: large steps in the convergence. Significantly smaller values also tend to lead to under-fitting: giving good performance until a certain point, with erratic behavior thereafter.

Figure 14:
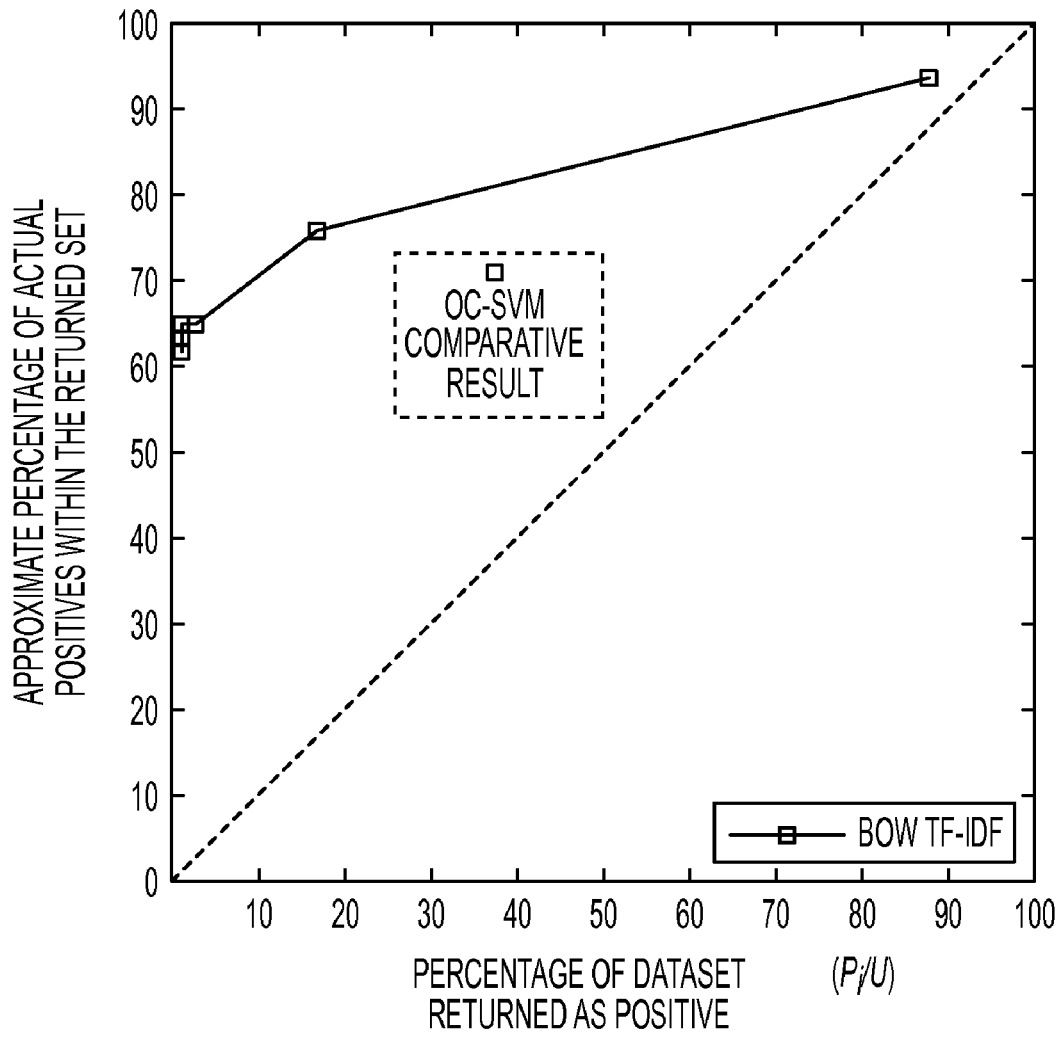
FIG. 14 is a plot illustrating the performance of the "best" text-based classifier identified in the tests, using a bag of words feature set and td-idf feature values, the convergence steps being shown by squares, starting at the top right of the graph.

The performance curve for the "best" classifier found for text representations (bag of words, "bow") is shown in FIG. 14. It can be seen that during the convergence, performance degrades slowly, with a drop at the end. The object was to select a classifier that is just before the drop. Note also that the algorithm is clearly beating OC-SVM. The algorithm takes a huge first step in the convergence, yielding a hypothesis that separates out 75.8% of the positives in 16.8% of the data.

Figure 15:
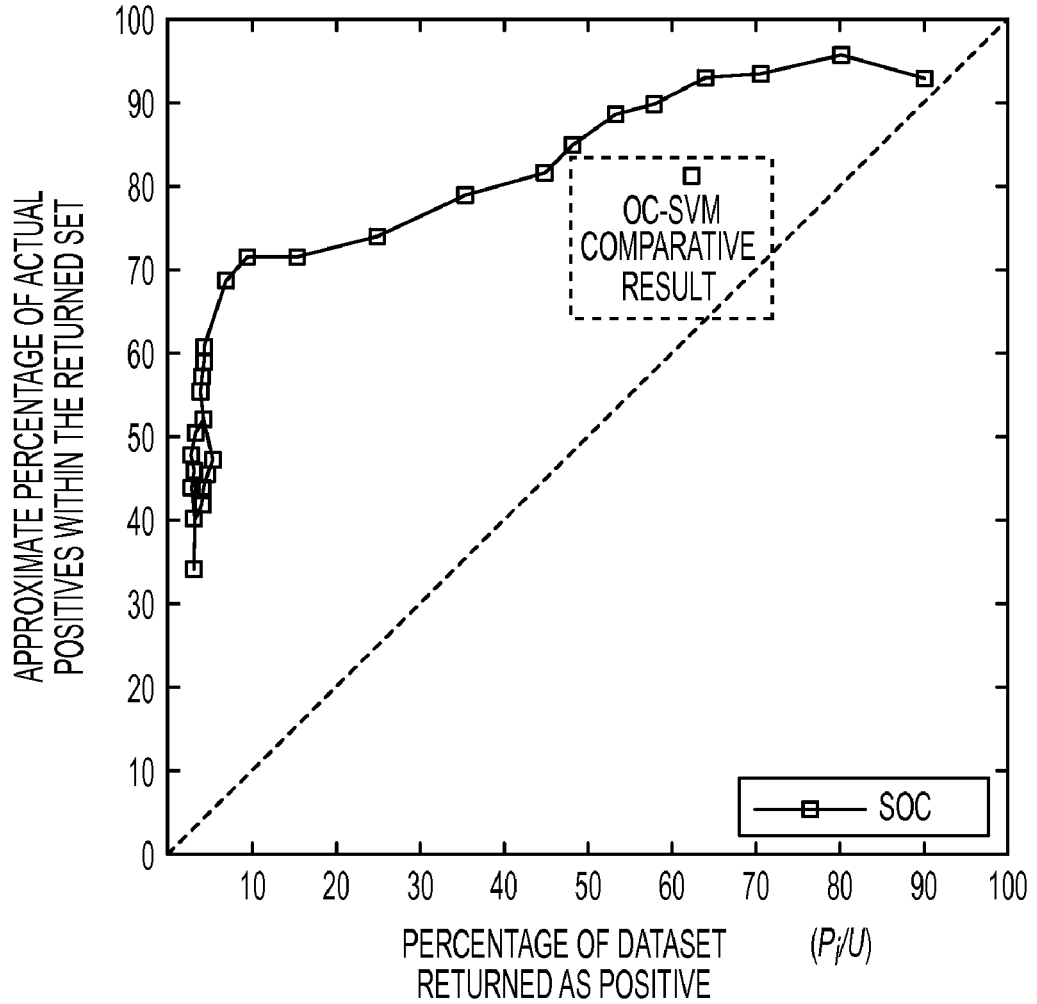
FIG. 15 is a plot illustrating the performance of the "best" social network-based classifier identified in the tests, using γ=0.1, the convergence steps being shown by squares, starting at the top right of the graph.

The performance curve for the "best" classifier found for social networks representations ("soc") is shown in FIG. 15. Optimally, 71.5% of the positives are selected in 9.4% of the data.

Combining Classifiers

Combining the classifiers described above was then evaluated. It was found that in both combination methods (naïve and MCC), the best results are obtained using the bag-of-words representation with all features and tf-idf values combined with the social network feature set.

In the first, naive way of combining the two classifiers, their predictions were aggregated and the performance measured. For an aggregation function, the average of the predictions was used. At each iteration, a limited number of objects classified as negative with the highest certainty by the two classifiers combined, is labeled as negative.

Figure 16:
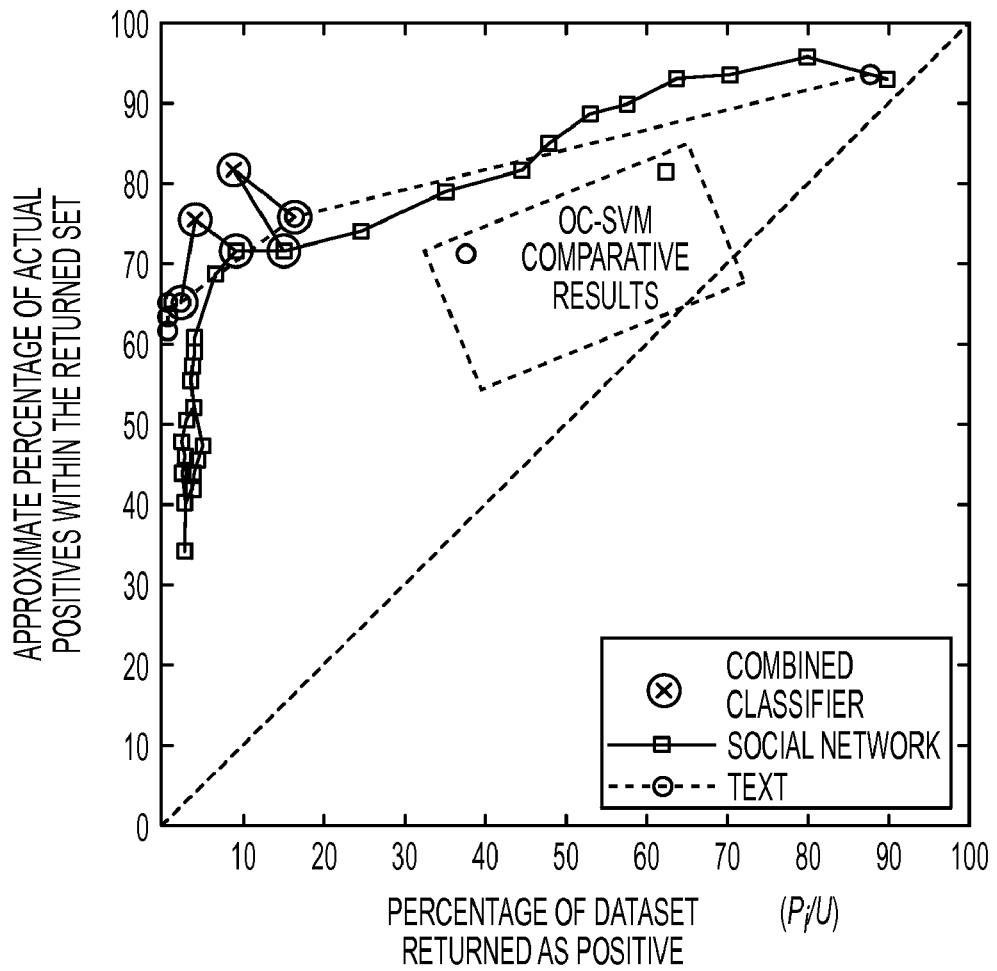
FIG. 16 is a plot illustrating the effect on performance of combining classifiers by linear combination on the Enron corpus.

In FIG. 16, combined classifiers were obtained by combining the classifiers obtained at the 12th and 13th steps on the social network curve and the 2nd and 3rd steps of the text curve. It can be seen that this results in a movement towards the top left of the graph, indicating a classification that takes less data while retrieving more of the positives.

In the second approach, the hypotheses appearing on the curve are based on a small part of the data. The performance is excellent, providing above 90% recall of the positives while discarding over 90% of the data.

Figure 17:
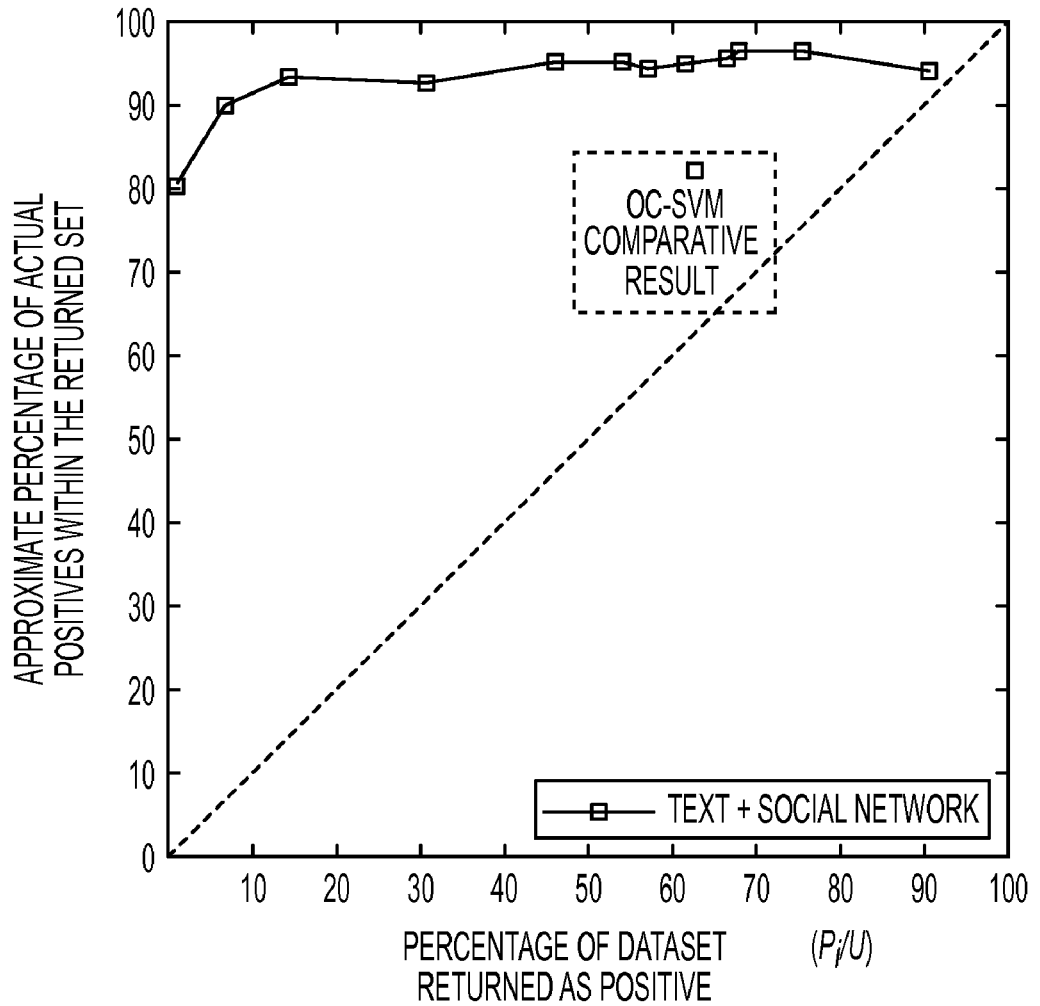
FIG. 17 is a plot illustrating the effect of combining classifiers by co-training with a Mapping Co-convergence framework on performance on the Enron corpus.

FIG. 17 shows the results obtained by using co-training (MCC) with Algorithm 2.

As explained above, the curves can be compared by comparing their "best" classifier, taking the Euclidian distance to (0,100), the perfect classifier, to be the measure of comparison. TABLE 1 lists the "best" classifiers of the curves. We can see that the combination of social network-based and text-based feature sets does indeed yield very good results.

TABLE 1

Comparison of the different classifiers

| classifier | A: % of data removed | B: % of data in A which is positive | distance from optimal (0, 100 on the graph) |
|---|---|---|---|
| text (bow tf-idf) (FIG. 13) | 75.81 | 16.80 | 29.45 |
| social network (FIG. 14) | 71.51 | 9.40 | 30.00 |
| Text + social (naïve) (FIG. 15) | 81.62 | 9.22 | 20.56 |
| text + social (MCC) (FIG. 16) | 90.32 | 6.40 | 11.60 |

From the results on the Enron corpus, it can be concluded that the multi-modality approach, using multiple levels of description, yields good results, better than for a conventional SVM. The combination of co-training within the Mapping Convergence framework provides a dramatically improvement in classification results, although the naïve approach provides some improvements.

It appears that in the mapping phase of the framework, a conservative approach is less likely to result in compounding effects of an initial bad classification. It is, however, desirable to include enough data in the first approximation of the negative set to support convergence. In experiments on the Enron corpus, it appears that labeling 5-10% with a one-class classifier is usually enough to keep the convergence going and avoid undesirable compounding effects.

Even though there are relatively few parameters to be selected, the algorithms are somewhat sensitive to the selection of parameters. For any new dataset, experiments to identify suitable values, such as a suitable value of $\gamma$, as illustrated in FIG. 12, may therefore be appropriate.

The use of cross validation appears to improve results with a corpus which does not contain labels for much of the data. Five-fold cross validation was used in the present example. The split is randomly made on every step in the convergence. Discrepancy between runs could be reduced by using a greater number of folds, e.g., 10-fold cross-validation or higher, although at a higher computational cost.

With only a very small size for the initial positive set, randomly selecting only a subset of the entire data set for the unlabeled set may have advantages. For similar data sets, the large initial corpus could be randomly subdivided into subsets and the method performed, as described above, for each of the subsets, using the same set of initial positives. The output of positives for each subset could then be combined to generate a set of objects for review by appropriate trained personnel.

Alternatively, a classifier trained on one subset of unlabeled objects could be used to label the entire corpus of unlabeled objects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A classification method comprising:
receiving a set of objects, the objects comprising electronic mail messages, a subset of the objects having class labels;
extracting features associated with each of a first and a second modality, the second of the modalities being a social-network modality in which social network features are extracted from a social network implicit in the electronic mail messages, from objects in the set of objects and generating a representation of each object based on its extracted features;
training a classifier system based on the class labels of the subset of the set of objects and on the representations generated for each of the modalities; and
predicting labels for unlabeled objects in the set of objects using the trained classifier system.

2. The method of claim 1, wherein the classifier system is a one-class classifier system.

3. The method of claim 2, wherein the training of the classifier system comprises, for at least one of the first and second modalities, training a classifier, the training including, based on an initial set of positively labeled objects, generating an initial hypothesis which predicts negative labels for a subset of the unlabeled objects in the set and iteratively generating a new hypothesis in which a new boundary between representations of objects predicted as having negative labels and representations of objects predicted as having positive labels converges towards an original boundary between the representations of the initial positively labeled objects and the rest of the objects.

4. The method of claim 3, wherein the iteration is stopped prior to convergence between the new and original boundaries.

5. The method of claim 3, wherein for each modality, an iteration is selected which optimizes at least one performance criterion, and wherein predictions of the classifiers at those iterations are aggregated.

6. The method of claim 3, wherein at an iteration, the objects predicted as having negative labels and objects predicted as having positive labels are based on aggregated predictions from the classifiers.

7. The method of claim 1, wherein the extracting of social network features includes:
identifying a set of actors in the social network, based on the electronic messages;
assigning features to the actors in the social network, based on the electronic message traffic in the social network; and
propagating the actors' features to electronic messages between actors.

8. The method of claim 7, wherein the actors' features include features based on at least one of the amount of electronic message traffic between the actor and other actors, whether the actor serves as a hub in the network; and the actor's presence in one or more cliques.

9. The method of claim 7, wherein the assigning features to the actors in the social network includes computing a set of features from a graph of the social network in which actors are represented by nodes and connection lines between pairs of nodes represent electronic messages sent by a respective first actor to a respective second actor in the social network.

10. The method of claim 9, wherein the set of features include features selected from the group consisting of:
1) an activity score based on number of electronic messages sent by the actor;
2) a hub score for the actor based on a number of outgoing connection lines from the actor in the graph of the social network;
3) an authority score based on the number of incoming connection lines to the actor in the graph of the social network;
4) a mean centrality of the actor based on a total number of actors in the graph divided by the sum of all distances between the actor and each other actor in the graph;
5) a degree of centrality of the actor;
6) a neighborhood centrality of the actor based on a number of paths comprising at least two connected connection lines which pass through the actor;
7) a closeness centrality which is based on the inverse of a maximum distance between the actor and any other actor;
8) a stress centrality based on a sum of the number of number of paths comprising at least two connected connection lines which pass through the actor;
9) a clustering coefficient based feature which characterizes a ratio of the connectedness in the direct neighborhood of the node;
10) a number of cliques that an actor is in, each clique comprising at least a preselected number of actors;
11) a raw clique score based on a number of cliques the actor is in and the clique sizes; and
12) a weighted clique score based on a number of cliques the actor in and a measure of activity of all actors of each clique.

11. The method of claim 7, wherein the propagating includes generating a feature set for each electronic mail message based on feature sets of the sender and at least one recipient of the electronic mail message and optionally also a number of recipients.

12. The method of claim 7, wherein the identifying of the set of actors in the social network includes resolving references to senders and recipients in the electronic messages.

13. The method of claim 1, wherein the first of the modalities is a text-based modality.

14. The method of claim 13, wherein the extracted features comprise a bag-of-terms, each of the terms corresponding to a word or cluster of words present in the dataset.

15. A classification apparatus comprising:
memory which stores instructions for performing a method comprising:
for each of first and second modalities:
extracting features from objects in a set of objects, the objects comprising electronic mail messages, and generating a representation of each object based on its extracted features;
the first of the modalities being a text-based modality, the second of the modalities being a social-network modality in which social network features are extracted from a social network implicit in the electronic mail messages;

training a classifier system based on class labels of a subset of the set of objects and on the representations generated for each of the modalities; and with the trained classifier system, predicting labels for unlabeled objects in the set of objects; and a processor, in communication with the memory for executing the instructions.

16. A non-transitory computer program product encoding instructions, which when executed by a computer, perform a method comprising:

receiving a set of objects, the objects comprising electronic mail messages, a subset of the objects having class labels;

extracting features associated with each of a first and a second modality, the second of the modalities being a social-network modality in which social network features are extracted from a social network implicit in the electronic mail messages, from objects in the set of objects and generating a representation of each object based on its extracted features;

training a classifier system based on the class labels of the subset of the set of objects and on the representations generated for each of the modalities; and predicting labels for unlabeled objects in the set of objects using the trained classifier system.

17. A classification apparatus comprising:

an input for receiving a set of objects, the objects comprising electronic mail messages, a subset of the objects having class labels;

a first feature extractor which extracts text-based features from objects in the set of objects;

a second feature extractor which extracts social network-based features from the objects in the set of objects;

a classifier system, which predicts labels for unlabeled objects in the set of objects based on the class labels of the subset of objects having class labels and the extracted text-based and social network-based features; and a processor which executes the classifier system.

18. A classification method comprising:

receiving a set of objects, the objects comprising electronic mail messages, an initial subset of the objects being positively labeled with respect to a class;

extracting features associated with each of a first and a second modality from objects in the set of objects and generating a representation of each object based on its extracted features;

training a one-class classifier system based on class labels of the subset of the set of objects and on the representations generated for each of the first and second modalities, the training including, for each of the modalities:

based on the initial set of objects that are positively labeled with respect to the class, generating an initial hypothesis which predicts negative labels for a subset of unlabeled objects in the set of objects, and iteratively generating a new hypothesis in which a new boundary between representations of objects predicted as having negative labels and representations of objects predicted as having positive labels converges towards an original boundary between the representations of the initial positively labeled objects and the rest of the objects in the set; and predicting labels for unlabeled objects in the set of objects using the trained classifier system.

19. The method of claim 18, wherein the iteration is stopped prior to convergence between the new and original boundaries.

20. The method of claim 19, wherein for each modality, an iteration is selected which optimizes at least one performance criterion, and wherein predictions for each of the modalities at those iterations are aggregated.

21. The method of claim 19, wherein at each of a plurality of iterations, the objects predicted as having negative labels and objects predicted as having positive labels are based on aggregated predictions of each of the first and second modalities.

22. The method of claim 18, wherein the first of the modalities is a text-based modality and the second of the modalities is a social network-based modality.

* * * * *